(12) United States Patent
Murayama et al.

(10) Patent No.: US 12,528,079 B2
(45) Date of Patent: Jan. 20, 2026

(54) CARBON DIOXIDE REDUCTION CATALYST AND CARBON DIOXIDE REDUCTION METHOD

(71) Applicant: The Chugoku Electric Power Co., Inc., Hiroshima (JP)

(72) Inventors: Toru Murayama, Hachioji (JP); Tamao Ishida, Hachioji (JP); Chihiro Mochizuki, Hachioji (JP); Ali M. Abdel-Mageed, Ulm (DE); Rolf Jurgen Behm, Ulm (DE)

(73) Assignee: THE CHUGOKU ELECTRIC POWER CO., INC., Hiroshima (JP)

( * ) Notice: Subject to any disclaimer, the term of this patent is extended or adjusted under 35 U.S.C. 154(b) by 597 days.

(21) Appl. No.: 17/921,026

(22) PCT Filed: Apr. 19, 2021

(86) PCT No.: PCT/JP2021/015916
§ 371 (c)(1),
(2) Date: Oct. 24, 2022

(87) PCT Pub. No.: WO2021/215408
PCT Pub. Date: Oct. 28, 2021

(65) Prior Publication Data
US 2023/0166242 A1   Jun. 1, 2023

(30) Foreign Application Priority Data

Apr. 24, 2020 (JP) .................................. 2020-077403

(51) Int. Cl.
*B01J 23/89* (2006.01)
*B01J 23/06* (2006.01)
(Continued)

(52) U.S. Cl.
CPC .......... *B01J 23/8913* (2013.01); *B01J 23/06* (2013.01); *B01J 35/393* (2024.01); *B01J 35/45* (2024.01);
(Continued)

(58) Field of Classification Search
CPC ..... C07C 29/154; B01J 23/80; B01J 23/8913; B01J 23/06
See application file for complete search history.

(56) References Cited

FOREIGN PATENT DOCUMENTS

| CN | 106076396 A | 11/2016 |
|---|---|---|
| CN | 107185543 A | 9/2017 |

(Continued)

OTHER PUBLICATIONS

By Kaskow et al., the effect of copper and silver on the properties of Au—ZnO catalyst and its activity in glycerol oxidation, (Applied Surface Science 444 (2018) 197-207.*

(Continued)

*Primary Examiner* — Jafar F Parsa
(74) *Attorney, Agent, or Firm* — MUNCY, GEISSLER, OLDS & LOWE, P.C.

(57) ABSTRACT

The present invention provides a carbon dioxide reduction catalyst that is used in reduction reactions of carbon dioxide and that has high methanol selectivity. A carbon dioxide reduction catalyst according to the present invention is used in producing methanol by reduction reactions of carbon dioxide, and contains Au and Cu as catalyst components and ZnO as a carrier. It is preferable that the catalyst components contain 7-25 mol % of Au as a catalyst component. This makes it possible to obtain high methanol selectivity—for example, selectivity of not less than 80%. The carbon dioxide reduction catalyst makes it possible to obtain high methanol selectivity even under the conditions of not more than 240° C. and not more than 50 bar.

8 Claims, 26 Drawing Sheets

(51) Int. Cl.
  *B01J 35/30* (2024.01)
  *B01J 35/45* (2024.01)
  *B01J 35/70* (2024.01)
  *C07C 29/154* (2006.01)

(52) U.S. Cl.
  CPC ............. *B01J 35/70* (2024.01); *C07C 29/154* (2013.01); *B01J 2235/00* (2024.01); *B01J 2235/15* (2024.01); *B01J 2235/30* (2024.01)

(56) References Cited

FOREIGN PATENT DOCUMENTS

| | | |
|---|---|---|
| CN | 110433864 A | 11/2019 |
| JP | H03-258737 A | 11/1991 |
| JP | H04-122450 A | 4/1992 |
| JP | 2010-235550 A | 10/2010 |
| TW | 200738338 A | 10/2007 |

OTHER PUBLICATIONS

Xiaohao et al (CN 109364931, date published Feb. 22, 2019, machine translation).*

Pasupulety, Nagaraju et al., "Studies on Au/Cu—Zn—Al catalyst for methanol synthesis from CO2, Applied Catalysis", A: General, 2015, vol. 504, p. 308-318, DOI : 10.1016/j.apcata.2015.01.036, Feb. 25, 2015.

Martin, Oliver et al., "Zinc-Rich Copper Catalysts Promoted by Gold for Methanol Synthesis", ACS Catalysis, 2015, vol. 5, pp. 5607-5616, DO: 10.1021/acscatal.5b00877, Aug. 18, 2015.

Kim, Ki-Joong et al., "Effect of Gold Nanoparticles Addition to CuO-ZnO/Al2O3 Catalyst in Conversion of Carbon Dioxide to Methanol", Journal of nanoscience and nanotechnology, 2017, vol. 17, No. 4, pp. 2724-2727, DOI:10.1166/jnn.2017.13359, Apr. 1, 2017.

Pasupulety, Nagaraju et al., "Influence of preparation method on the catalytic activity of Au/Cu—Zn—Al catalysts for CO2 hydrogenation to methanol", Comptes Rendus de l'Academie Bulgare des Sciences, 2015, vol. 68, No. 12, pp. 1511-1518, Jul. 21, 2015.

Liao, Yi-Chun et al., "Photo-triggered catalytic reforming of methanol over gold-Promoted, copper-Zinc catalyst at low ignition temperature," Applied Catalysis B. Environmental, Jan. 2018, pp. 264-271, vol. 220, Elsevier, Amsterdam, NL (XP 085198074).

Saidani, Mohamed Ali et al., "Copper-doped hybrid Ag-Au@ZnO nanoparticles and their enhanced photocatalytic activities," Journal of Inorganic and Organometallic Polymers and Materials, Jan. 14, 2019, pp. 1130-1140, vol. 29, Issue No. 4, Springer, New York (XP 036921406).

Lei, Hong et al., "Cylindrical shaped ZnO combined Cu catalysts for the hydrogenation of CO2 to methanol," Royal Society of Chemistry—Advances, May 3, 2019, pp. 13696-13704, vol. 9, Issue No. 24.

* cited by examiner

CARBON DIOXIDE REDUCTION CATALYST AND CARBON DIOXIDE REDUCTION METHOD

TECHNICAL FIELD

The present invention relates to a carbon dioxide reduction catalyst and a method for reducing carbon dioxide.

BACKGROUND ART

Carbon dioxide ($CO_2$) is one of the substances emitted into the atmosphere by the combustion of fuel. Since carbon dioxide may contribute to global warming, carbon dioxide emissions into the atmosphere are regulated by international conventions on climate change, etc. Therefore, technologies have been proposed to convert carbon dioxide into industrially useful substances in order to decrease carbon dioxide emissions into the atmosphere.

For example, a technology for converting carbon dioxide to methanol, which has been widely used as a raw material for various industries, has been known. In industrial use, for example, there has been known a method for converting a gas containing carbon dioxide and hydrogen to methanol by a reduction reaction using a copper-zinc catalyst under conditions of 250° C. or more and 50 atm or more. However, this method has a problem of high energy cost since it requires high-temperature and high-pressure conditions for the reaction. Furthermore, the method also has a problem of an insufficient methanol selectivity since water produced by the reaction lowers a catalytic activity. Therefore, there is a need to develop a technology for a carbon dioxide reduction catalyst that can produce methanol at a low cost and achieve a satisfactory methanol selectivity.

Patent Document 1: Chinese Patent Application Publication No. 106076396

Patent Document 1 discloses a technology concerning a method for preparing an Au—Cu-supported mesoporous catalyst in which Au-doped Cu is supported on mesoporous silica ($NH_2$-SBA-15) serving as a catalyst for use in production of methanol by a reduction reaction of carbon dioxide. However, the technology disclosed in Patent Document 1 has a problem of an insufficient methanol selectivity in the reduction reaction of carbon dioxide.

DISCLOSURE OF THE INVENTION

Problems to be Solved by the Invention

The present inventors conducted extensive studies to improve a carbon dioxide reduction catalyst and have found a carbon dioxide reduction catalyst exhibiting an excellent methanol selectivity.

The present invention has been made in view of the above-described problem, and an object thereof is to provide a carbon dioxide reduction catalyst for use in a reduction reaction of carbon dioxide, the catalyst exhibiting a high methanol selectivity.

Means for Solving the Problems

The present invention relates to a carbon dioxide reduction catalyst for use in production of methanol by a reduction reaction of carbon dioxide, the catalyst including Au and Cu serving as catalyst components and ZnO serving as a support.

The catalyst components preferably include 2 to 25% by mole of the Au.

For the above-mentioned carbon dioxide reduction catalyst, a methanol selectivity in reduction of carbon dioxide is preferably 80% or more.

Furthermore, the present invention relates to a method for reducing carbon dioxide including reducing carbon dioxide using the above-mentioned carbon dioxide reduction catalyst under a condition of 50 bar or less to thereby produce methanol.

Furthermore, the present invention relates to a method for reducing carbon dioxide including reducing carbon dioxide using the above-mentioned carbon dioxide reduction catalyst under a condition of 240° C. or less to thereby produce methanol.

Effects of the Invention

The carbon dioxide reduction catalyst of the present invention exhibits a higher methanol selectivity in a reduction reaction of carbon dioxide compared to the related art.

BRIEF DESCRIPTION OF THE DRAWINGS

FIG. 18 is a chart showing the results of an XAFS analysis of Examples and the like;

FIG. 19 is a chart showing the results of an XAFS analysis of Examples and the like;

FIG. 20 is a chart showing the results of an XAFS analysis of Examples and the like;

FIG. 21 is a chart showing the results of an XAFS analysis of Examples and the like;

PREFERRED MODE FOR CARRYING OUT THE INVENTION

[Carbon Dioxide Reduction Catalyst]

Figure 1:
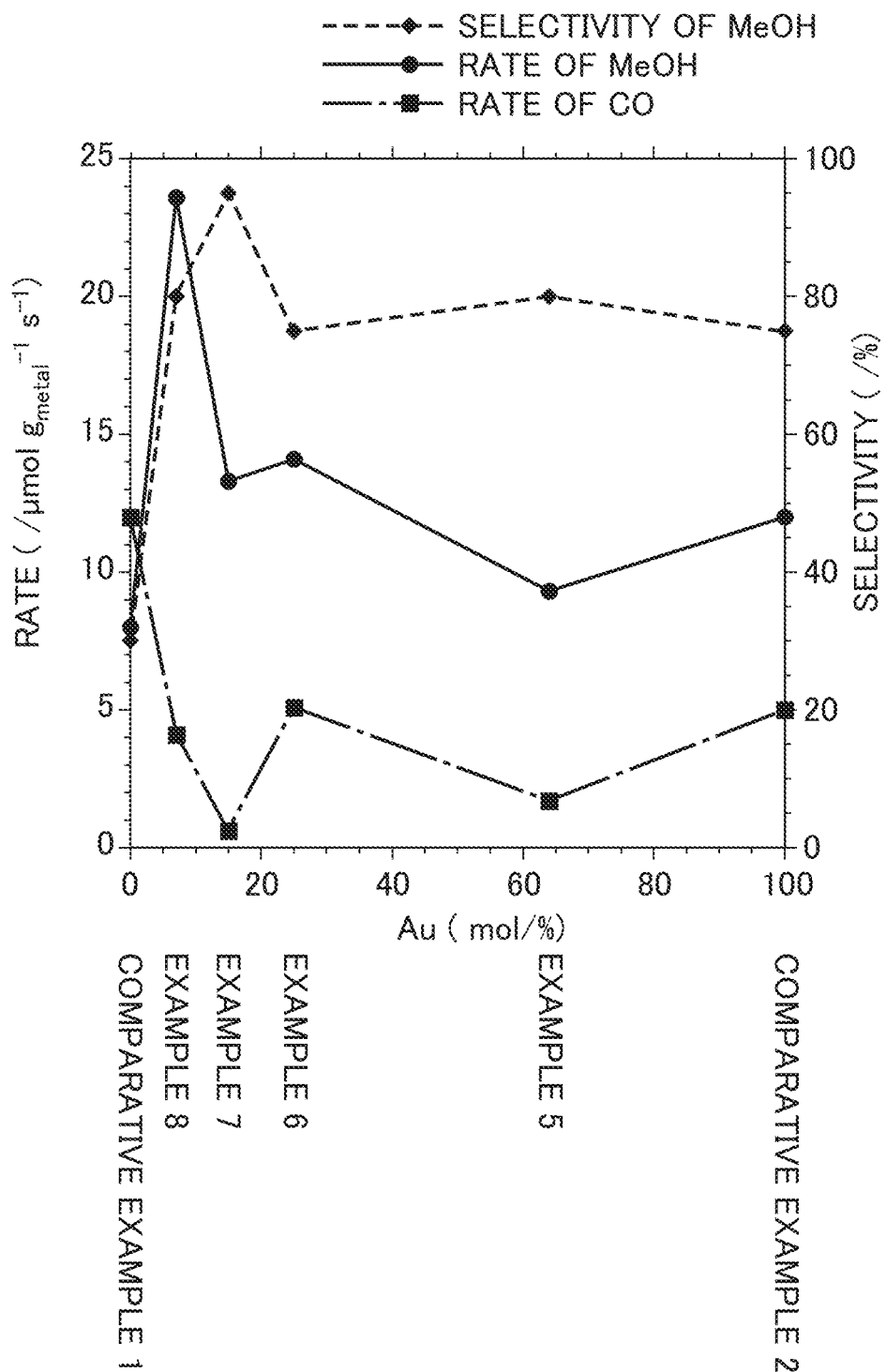
FIG. 1 is a graph showing a methanol selectivity, a methanol production rate, and a carbon monoxide production rate for the carbon dioxide reduction catalysts of Examples and Comparative Examples.

A carbon dioxide reduction catalyst according to the present embodiment includes gold (Au) and copper (Cu) serving as catalyst components and ZnO serving as a support. The above-mentioned carbon dioxide reduction catalyst exhibits a higher methanol selectivity in a reduction reaction of carbon dioxide compared to conventionally known catalysts and, for example, achieves a methanol selectivity of 80% or more. The methanol selectivity is expressed as a rate (%) of an amount of substance (mol) of methanol produced by a reduction reaction relative to an amount of substance (mol) of carbon dioxide converted by the reduction reaction.

The carbon dioxide reduction catalyst according to the present embodiment includes gold (Au) and copper (Cu) as the catalyst components. The catalyst components preferably include 2 to 25% by mole of the gold (Au). When a content of the gold (Au) in the catalyst components falls within the above-mentioned range, the carbon dioxide reduction catalyst achieves a satisfactory methanol selectivity. The catalyst components more preferably include 4 to 25% by mole and further preferably 7 to 25% by mole of the gold (Au). Other catalyst components other than the gold (Au) or the copper (Cu) may be included as the catalyst components unless the effect of the present invention is inhibited. The catalyst components are preferably supported on the catalyst at a rate of 0.1 to 10% by weight, more preferably 0.1 to 5% by weight, and further preferably 0.1 to 3% by weight.

The gold (Au) serving as the catalyst component is preferably present in the catalyst as elemental metallic particles. For example, the gold (Au) preferably has a particle diameter of 50 nm or less and more preferably 20 nm or less. This increases the number of reaction sites for the catalyst component to thereby enhance an activity of the catalyst.

The copper (Cu) serving as the catalyst component is present in the catalyst as copper oxide, elemental copper, a copper-zinc alloy, or a copper-gold alloy. Furthermore, the catalyst components preferably include 30 to 99.9% by mole, more preferably 30 to 99.9% by mole, and further preferably 75 to 99.9% by mole of the copper (Cu). The copper (Cu) and the gold (Au) serving as the catalyst components are preferably contained at a ratio of Cu to Au of 49:1 to 1:3 in terms of the amount of substance.

The gold (Au) and the copper (Cu) serving as the catalyst components are in the form of a metal hydroxide $(Au(OH)_3$—$Cu(OH)_2)$ immediately after they are supported on a support such as ZnO in the below-mentioned catalyst component supporting step. Then, the gold (Au) and the copper (Cu) are reduced through the below-mentioned hydrogen reduction treatment step to elemental metal or a metal alloy. Then, it is believed that the copper (Cu) is gradually and partially oxidized over time in the air to copper oxide (II) (CuO) and copper oxide (I) ($Cu_2O$).

It is preferable that the catalyst components including the gold (Au) and the copper (Cu) are dispersively supported on the support including ZnO. This brings the catalyst components into contact with the support on a larger area to thereby enhance an activity of the catalyst. In addition thereto, the gold (Au) and the copper (Cu) are preferably supported together in the same small area, for example, within a 100 nm square, preferably a 10 nm square. Furthermore, the gold (Au) and the copper (Cu) preferably form an alloy. This achieves a high methanol selectivity in the reduction reaction of carbon dioxide.

The carbon dioxide reduction catalyst according to the present embodiment includes ZnO as a support. The catalyst components including the gold (Au) and the copper (Cu) are supported in the support including the ZnO. Inclusion of the ZnO as the support can enhance an activity of the catalyst components. A crystallite diameter of the ZnO serving as the support is not particularly limited, but is, for example, 10 to 60 nm. Other supports other than the ZnO may be included as the support unless the effect of the present invention is inhibited.

A specific surface area of the carbon dioxide reduction catalyst according to the present embodiment is not particularly limited, but the carbon dioxide reduction catalyst preferably has a BET specific surface area of 5 $m^2/g$ or more and more preferably 10 $m^2/g$ or more

[Method for Producing Carbon Dioxide Reduction Catalyst]

A method for producing a carbon dioxide reduction catalyst according to the present embodiment includes, for example, a firing step which is a step of firing a support including ZnO; a catalyst component supporting step which is a step of allowing catalyst components including Au and Cu to be supported on the support; and a hydrogen reduction treatment step.

The firing step is a step of firing a support including ZnO. A firing temperature may be, for example, 300° C. to 500° C. A method for firing is not particularly limited. For example, the support may be fired using a known firing device in the air.

The catalyst component supporting step is not particularly limited. For example, known methods such as a deposition and precipitation method, a coprecipitation method, a deposition and reduction method, a gas-phase grafting, and a solid-phase mixing method are exemplified. Hereinafter, the deposition and precipitation method will be described as an example. In the deposition and precipitation method, first, the support which has been fired in the firing step is suspended in water. Next, alkali is added to the above-mentioned suspension to adjust to pH 8 to 9. Next, a gold compound and a copper compound are added to the above-mentioned suspension and alkali is further added thereto to adjust to about pH 7. Thus, the catalyst components are deposited and precipitated on the support. Next, the catalyst components are dispersed and fixed on a surface of the support by continuously stirring the above-mentioned suspension for 1 hour or more while adjusting a concentration and pH of each of the components and a temperature. Next, the catalyst components dispersed and fixed on the surface of the support are washed with water and then dried to thereby obtain a precursor of the carbon dioxide reduction catalyst.

The gold compound to be used for allowing the catalyst components to be supported on the surface of the support in the deposition and precipitation method is not particularly limited, but examples thereof include a gold salt and a gold complex such as tetrachloroauric acid ($HAuCl_4$), tetrachloroaurate (e.g., $NaAuCl_4$), gold cyanide (AuCN), gold potassium cyanide ($K[Au(CN)_2]$), diethylamine trichloroaurate (($C_2H_5$)2NH·$AuCl_3$), an ethylenediamine-gold complex (e.g., chloride complex ($Au[C_2H_4(NH_2)_2]_2Cl_3$)) and a dimethyl β-diketone derivative-gold complex (e.g., dimethyl (acetylacetonate)gold (($CH_3$)$_2$Au[$CH_3COCHCOCH_3$])). The copper compound is not particularly limited, but, for example, copper nitrate ($Cu(NO_3)_2$) is used. The gold compound or the copper compound is not limited to the above-mentioned compounds and a salt or a complex which is soluble in water or an organic solvent may be used.

The alkali for adjusting pH in the deposition and precipitation method may be a hydroxide or carbonate of an alkaline metal, a hydroxide or carbonate of an alkaline earth metal, ammonia, and urea. In the deposition and precipitation method, a temperature of the suspension is preferably 0 to 90° C. and more preferably 30 to 70° C.

The hydrogen reduction treatment step is performed by treating the precursor obtained from the above-mentioned catalyst component supporting step in the presence of hydrogen. For conditions of the hydrogen reduction treatment, for example, the treatment may be performed by raising a temperature to a treatment temperature of 300° C. to 500° C. or more at 5° C./min in a hydrogen and nitrogen gas stream. A treatment time may be, for example, 2 hours. The catalyst components supported on the support are reduced to metal by the hydrogen reduction treatment step. The treatment temperature is preferably 400° C. or more and more preferably 500° C. or more. Thus, it is believed that the Au and the Cu serving as the catalyst components are reduced to thereby form an alloy, resulting in a carbon dioxide reduction catalyst exhibiting a high methanol selectivity. An upper limit of the treatment temperature is not particularly limited, but is preferably 600° C. or less. This can suppress lowering of an activity of the catalyst due to sintering.

[Method for Reducing Carbon Dioxide]

A method for reducing carbon dioxide using the carbon dioxide reduction catalyst according to the present embodiment provides a high methanol selectivity, for example, a methanol selectivity of 80% or more.

A reduction reaction of carbon dioxide ($CO_2$) is represented by Expressions (1) to (3) below:

$$CO_2 + 3H_2 \leftrightarrow CH_3OH + H_2O \quad (1)$$

$$CO_2 + 4H_2 \leftrightarrow CH_4 + 2H_2O \quad (2)$$

$$CO_2 + H_2 \leftrightarrow CO + H_2O \quad (3)$$

The reactions represented by Expressions (1) to (3) above are all equilibrium reactions. Furthermore, the reaction represented by Expression (1) is an exothermic reaction ($\Delta H_{298}$=−49.6 kJ/mol), the reaction represented by Expression (2) is an exothermic reaction ($\Delta H_{298}$=−165.0 kJ/mol), and the reaction represented by Expression (3) is an endothermic reaction ($\Delta H_{293}$=41.2 kJ/mol).

When the reactions represented by Expressions (2) and (3) above occur, methane ($CH_4$) and carbon monoxide (CO) are produced as end products, and methanol ($CH_3OH$) is not produced. Furthermore, water ($H_2O$) produced by a reverse water-gas shift reaction represented by Expression (3) above suppresses the reaction, causing lowering of the activity. Thus, the above-mentioned conventional method for reducing carbon dioxide cannot achieve the high methanol selectivity or the activity.

The method for reducing carbon dioxide using the carbon dioxide reduction catalyst according to the present embodiment provides the high methanol selectivity even when carbon dioxide is reduced under a reaction condition of 50 bar or less. The above-mentioned reaction condition is preferably 40 bar or less, more preferably 20 bar or less, and further preferably 10 bar or less. Furthermore, the reaction condition may be 5 bar or less. This allows an energy cost saving for realizing the reaction condition and achieves a satisfactory methanol selectivity.

The method for reducing carbon dioxide using the carbon dioxide reduction catalyst according to the present embodiment provides the high methanol selectivity even when carbon dioxide is reduced under a reaction condition of 240° C. or less. The above-mentioned reaction condition is preferably 220° C. or less and more preferably 200° C. or less. This allows an energy cost saving for realizing the reaction condition and achieves a satisfactory methanol selectivity.

Embodiments of the present invention have been described above, but the present invention is not limited to the above embodiments and modification or variation thereof is also encompassed in the present invention as long as the object of the present invention can be achieved.

EXAMPLES

Hereinafter, the present invention will be described in more detail with reference to Examples, but the present invention is not limited to Examples.

<Production of Carbon Dioxide Reduction Catalyst>

Example 1

A carbon dioxide reduction catalyst of Example 1 was produced as follows. First, ZnO serving as a support was fired at 300° C. for 2 hours in the presence of air. Fifty milliliters of water was added to 1.0 g of the thus-fired ZnO to produce a suspension, which was adjusted to pH 8 to 9 with a 1M NaOH solution. A liquid temperature was set to 60° C. Then, $HAuCl_4$ and $Cu(NO_3)_2$ serving as catalyst components were added to the thus-produced suspension so as to have an amount of Au contained in the catalyst components of 66% by mole, an amount of Cu contained in the catalyst components of 34% by mole, and an amount of a catalyst supported on the support of 1.31% by weight. The resultant was adjusted to pH 7 with a 1M NaOH solution. The resultant was stirred for 3 hours while a liquid temperature was kept at 60° C. Then, the resultant was cooled to room temperature and the resulting precipitate was washed with water (40° C.) five times. The resultant was dried at 80° C. overnight and then subjected to a hydrogen reduction treatment at 300° C. The hydrogen reduction treatment was performed under a hydrogen and nitrogen gas stream ($H_2$: 10 mL/min, $N_2$: 90 mL/min) at a heating rate of 5° C./min.

Examples 2 to 9, Comparative Examples 1 to 3

Carbon dioxide reduction catalysts of Examples 2 to 9 and Comparative Example 2 were prepared so as to each have the amount of supported catalyst, the Au content, and the Cu content described in Table 1. A temperature at which ZnO serving as a support is fired and a hydrogen reduction treatment temperature were as described in Table 1. The carbon dioxide reduction catalysts of Examples 2 to 9 and Comparative Example 2 were produced in the same manner as in Example 1 except for those mentioned above. A commercially available catalyst (catalyst component: Cu 100%, manufactured by Alfer Acer) was used as Comparative Example 1, and Comparative Example 3 was also a commercially available catalyst (catalyst component: Cu 100%, manufactured by C&CS company).

Examples 1 to 5 were measured for a particle diameter of Au serving as the catalyst component and a BET specific surface area. The particle diameter of Au was measured by determining particle diameter distribution with transmission electron microscopy (TEM). The results are presented in Table 1.

unit weight (g) of the catalyst components supported on the catalyst (metal). The results are presented in Table 1. In the graph in FIG. 1, a horizontal axis represents a rate of Au contained in the catalyst components (% by mole), a left vertical axis represents MeOH and CO production rates (/µmol g metal$^{-1}$ s$^{-1}$), and a right vertical axis represents a methanol selectivity (%). In FIG. 1, a dashed line represents the MeOH selectivity (%), a solid line represents the MeOH production rate, and an alternate long and short dash line represents the CO production rate (the same applies below).

As shown in FIG. 1, the carbon dioxide reduction catalysts of Examples all exhibited a MeOH selectivity and a MeOH production rate higher than those of Comparative Examples. Examples having the rate of Au contained in the catalyst components of 2 to 25% by mole exhibited an especially high MeOH selectivity. When the rate of Au contained in the catalyst components was 7 to 25% by mole, a further higher MeOH selectivity was exhibited.

(Test Under Condition of 240° C.)

Figure 2:
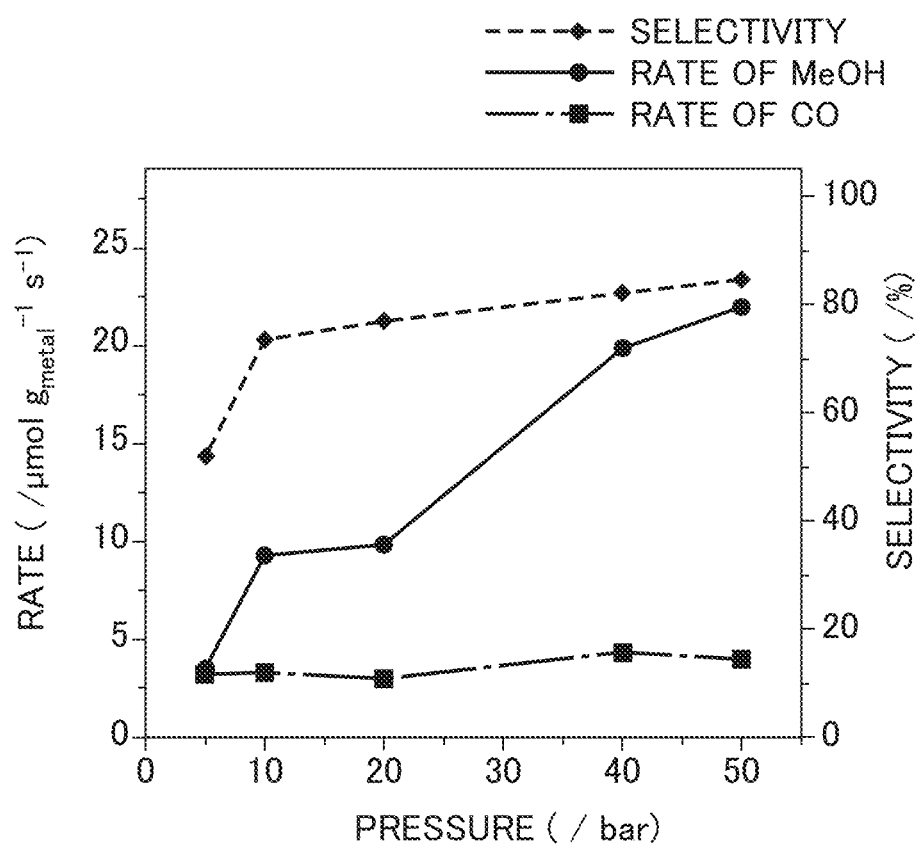
FIG. 2 is a graph showing a methanol selectivity, a methanol production rate, and a carbon monoxide production rate for the carbon dioxide reduction catalysts of Examples.

FIG. 2 is a graph showing the results of carbon dioxide reduction reactions using the carbon dioxide reduction catalyst of Example 8 under different pressure conditions. A temperature condition was 240° C. In the graph in FIG. 2, a horizontal axis represents a pressure condition in a carbon dioxide reduction reaction (bar), a left vertical axis and a right vertical axis represent the MeOH and CO production rates and the MeOH selectivity, respectively, as in FIG. 1. As shown in FIG. 2, tests were performed under the pressure conditions of 5 bar, 10 bar, 20 bar, 40 bar, and 50 bar.

As shown in FIG. 2, the carbon dioxide reduction catalyst of Example also exhibited a high MeOH selectivity under pressure conditions of 50 bar or less, or even 40 bar or less, 20 bar or less, 10 bar or less, and 5 bar or less.

TABLE 1

| | Amount of supported catalyst (wt %) | Au content (mol %) | Au particle diameter (nm) | Cu content (mol %) | ZnO firing temperature (° C.) | Hydrogen reduction treatment temperature (° C.) | BET specific surface area (m$^2$/g) |
|---|---|---|---|---|---|---|---|
| Example 1 | 1.31 | 66 | 2.2 ± 0.6 | 34 | 300 | 300 | 46.1 |
| Example 2 | 1.28 | 66 | 2.4 ± 1.1 | 34 | 300 | 400 | 18.9 |
| Example 3 | 1.28 | 66 | 4.1 ± 2.3 | 34 | 300 | 500 | 11.3 |
| Example 4 | 1.24 | 66 | 3.1 ± 1.7 | 34 | 500 | 400 | 12.2 |
| Example 5 | 1.22 | 64 | 4.2 ± 2.5 | 36 | 500 | 500 | 12.0 |
| Example 6 | 0.96 | 25 | 4.2 ± 1.5 | 75 | 500 | 500 | — |
| Example 7 | 0.83 | 15 | 4.0 ± 1.8 | 85 | 500 | 500 | — |
| Example 8 | 0.81 | 7 | 4.4 ± 1.2 | 93 | 500 | 500 | — |
| Example 9 | 3.7 | 5 | 16.1 ± 15.5 | 95 | 500 | 500 | — |
| Comparative Example 1 | — | 0 | — | 100 | — | — | — |
| Comparative Example 2 | — | 100 | — | 0 | — | — | — |
| Comparative Example 3 | — | 0 | — | 100 | — | — | — |

<Evaluation Results>
[Methanol Selectivity and Methanol Production Rate]

Carbon dioxide reduction reactions were performed using the carbon dioxide reduction catalysts of Examples 5, 6, 7, and 8 and Comparative Examples 1 and 2. The reactions were performed under conditions of a reaction pressure of 50 bar and a reaction temperature of 250° C., and a methanol (MeOH) selectivity (%), a methanol production rate (MeOH) and a carbon monoxide (CO) production rate were measured. Note that, each of the MeOH production rate and the CO production rate was calculated as a rate (µmol/s) per (Test Under Condition of 50 Bar)

Figure 3:
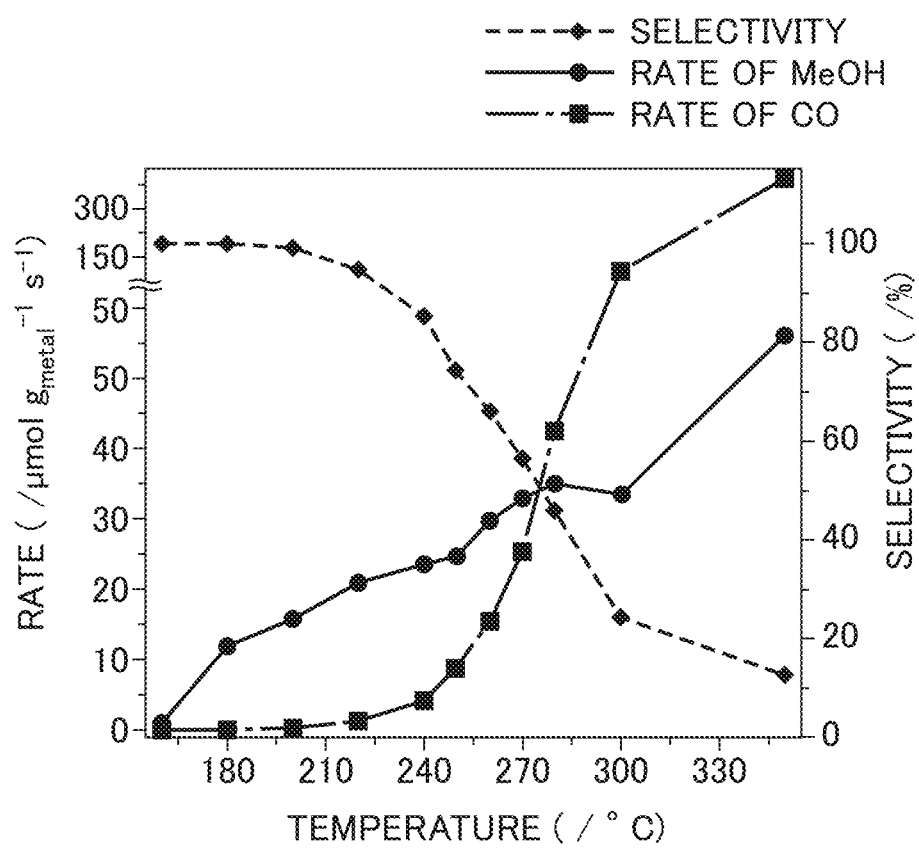
FIG. 3 is a graph showing a methanol selectivity, a methanol production rate, and a carbon monoxide production rate for the carbon dioxide reduction catalysts of Examples.
Figure 4:
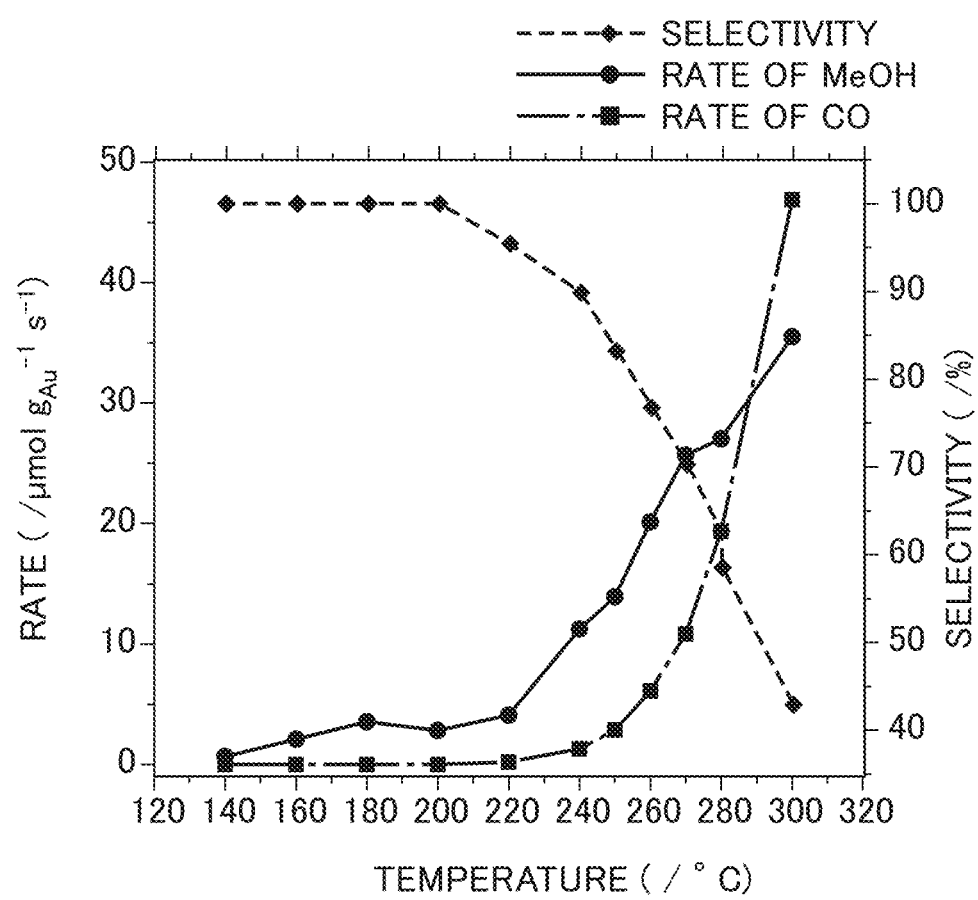
FIG. 4 is a graph showing a methanol selectivity, a methanol production rate, and a carbon monoxide production rate for the carbon dioxide reduction catalysts of Examples.
Figure 5:
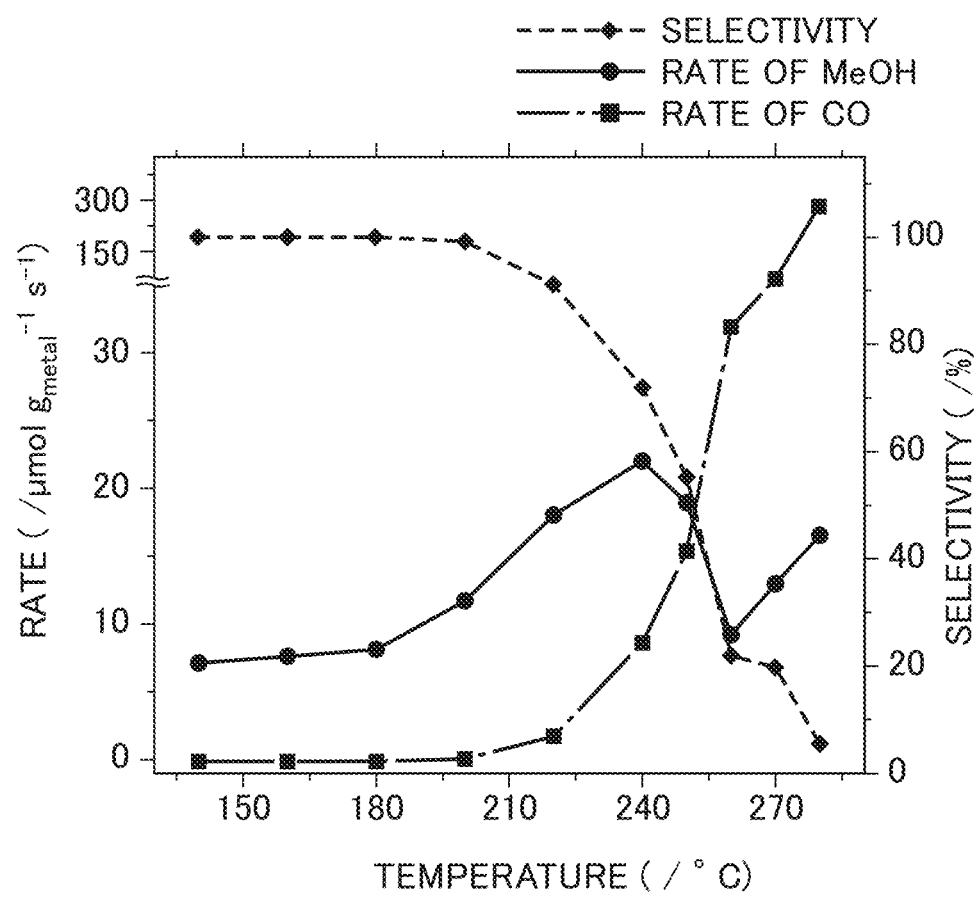
FIG. 5 is a graph showing a methanol selectivity, a methanol production rate, and a carbon monoxide production rate for the carbon dioxide reduction catalysts of Examples.

FIGS. 3, 4, and 5 are graphs showing the results of carbon dioxide reduction reactions using the carbon dioxide reduction catalysts of Example 8 (FIG. 3), Example 5 (FIG. 4), and Example 9 (FIG. 5), respectively, under different temperature conditions. The pressure condition was 50 bar in all tests. In the graphs in FIGS. 3, 4, and 5, a horizontal axis represents a reaction temperature (° C.), a left vertical axis and a right vertical axis represent the MeOH and CO production rates and the MeOH selectivity, respectively, as in FIG. 1.

As shown in FIGS. 3, 4, and 5, the carbon dioxide reduction catalysts of Examples exhibited a high MeOH selectivity at a temperature condition of 240° C. or less. Among them, when the temperature condition was 200° C. or less or even 180° C. or less, a high MeOH selectivity of almost 100% was exhibited.

(Test Under Condition of 10 Bar)

Figure 6:
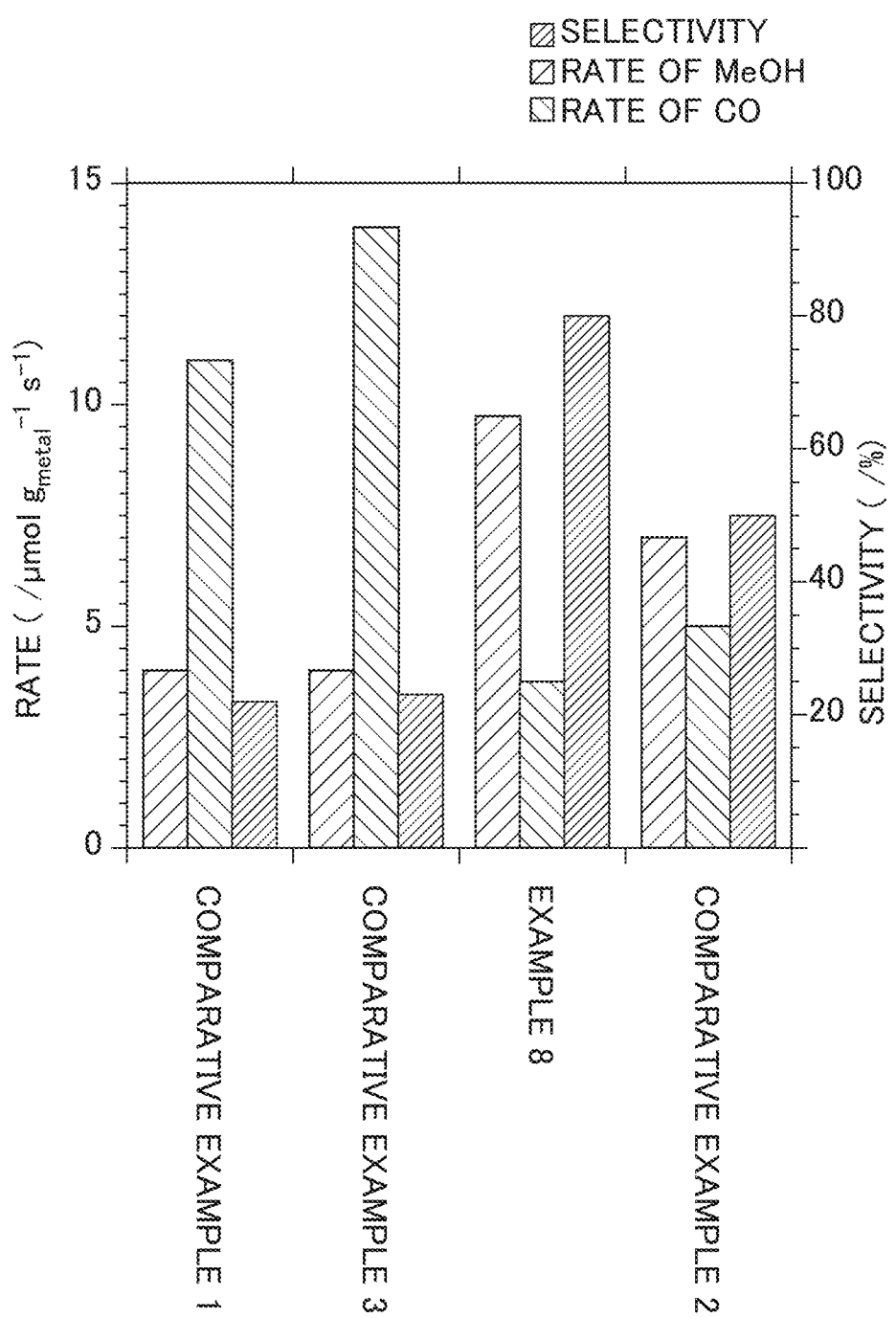
FIG. 6 is a graph showing a methanol selectivity, a methanol production rate, and a carbon monoxide production rate for the carbon dioxide reduction catalysts of Example and Comparative Examples.

FIG. 6 is a graph showing the results of carbon dioxide reduction reactions using the carbon dioxide reduction catalysts of Example 8 and Comparative Examples 1 to 3 under a pressure condition of 10 bar and a temperature condition of 240° C. In the graph in FIG. 6, a left vertical axis and a right vertical axis represent the MeOH and CO production rates and the MeOH selectivity, respectively, as in FIG. 1.

As shown in FIG. 6, the carbon dioxide reduction catalyst of Example exhibited a higher MeOH selectivity than those of the carbon dioxide reduction catalysts of Comparative Examples, that is, a high MeOH selectivity of 80% or more at a pressure condition of 10 bar.

(Test Under Condition of 50 Bar and 240° C.)

Figure 7:
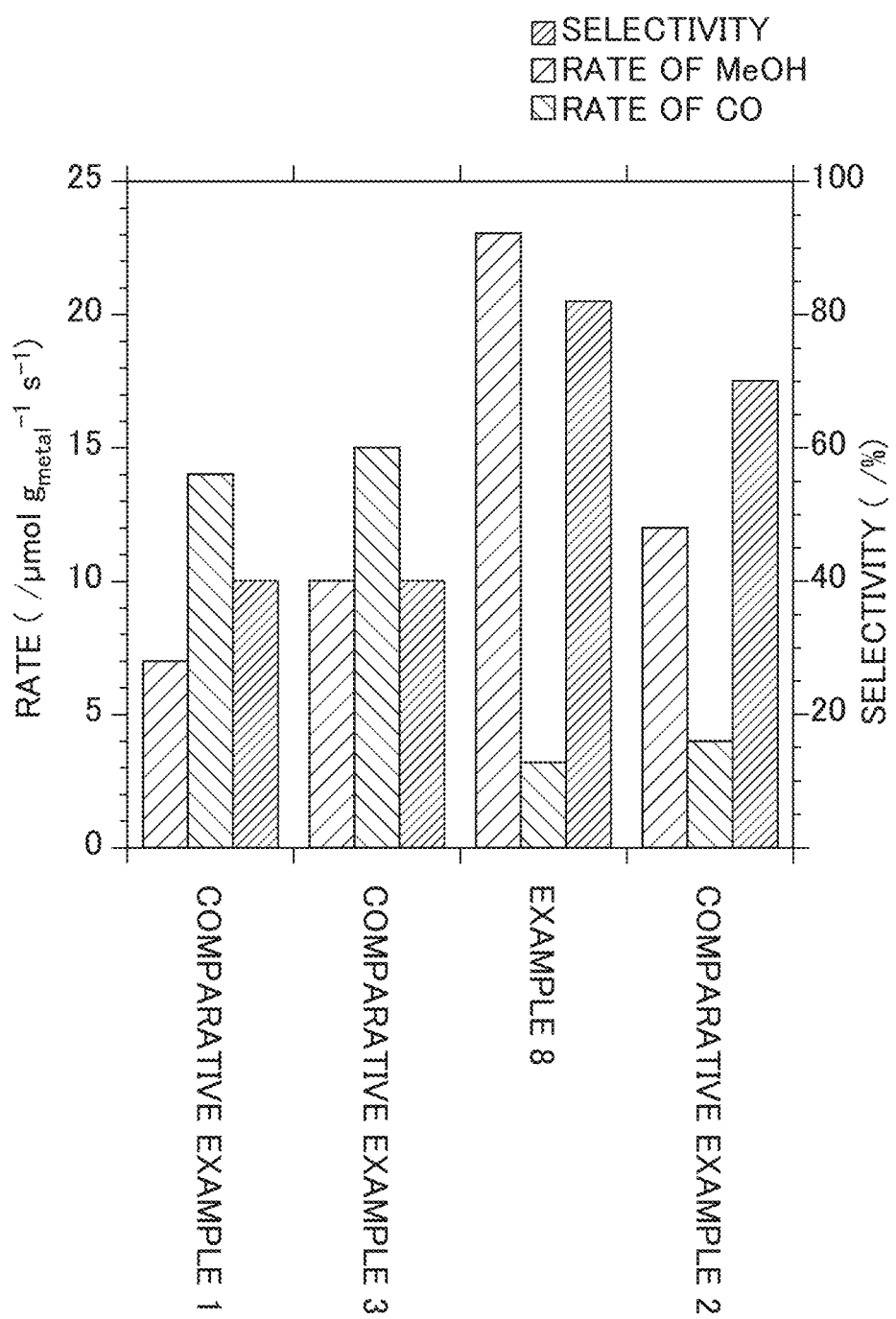
FIG. 7 is a graph showing a methanol selectivity, a methanol production rate, and a carbon monoxide production rate for the carbon dioxide reduction catalysts of Example and Comparative Examples.

FIG. 7 is a graph showing the results of carbon dioxide reduction reactions using the carbon dioxide reduction catalysts of Example 8 and Comparative Examples 1 to 3 under a pressure condition of 50 bar and a temperature condition of 240° C. In the graph in FIG. 7, a left vertical axis and a right vertical axis represent the MeOH and CO production rates and the MeOH selectivity, respectively, as in FIG. 6.

(Test Under Condition of 5 Bar and 240° C.)

Figure 8:
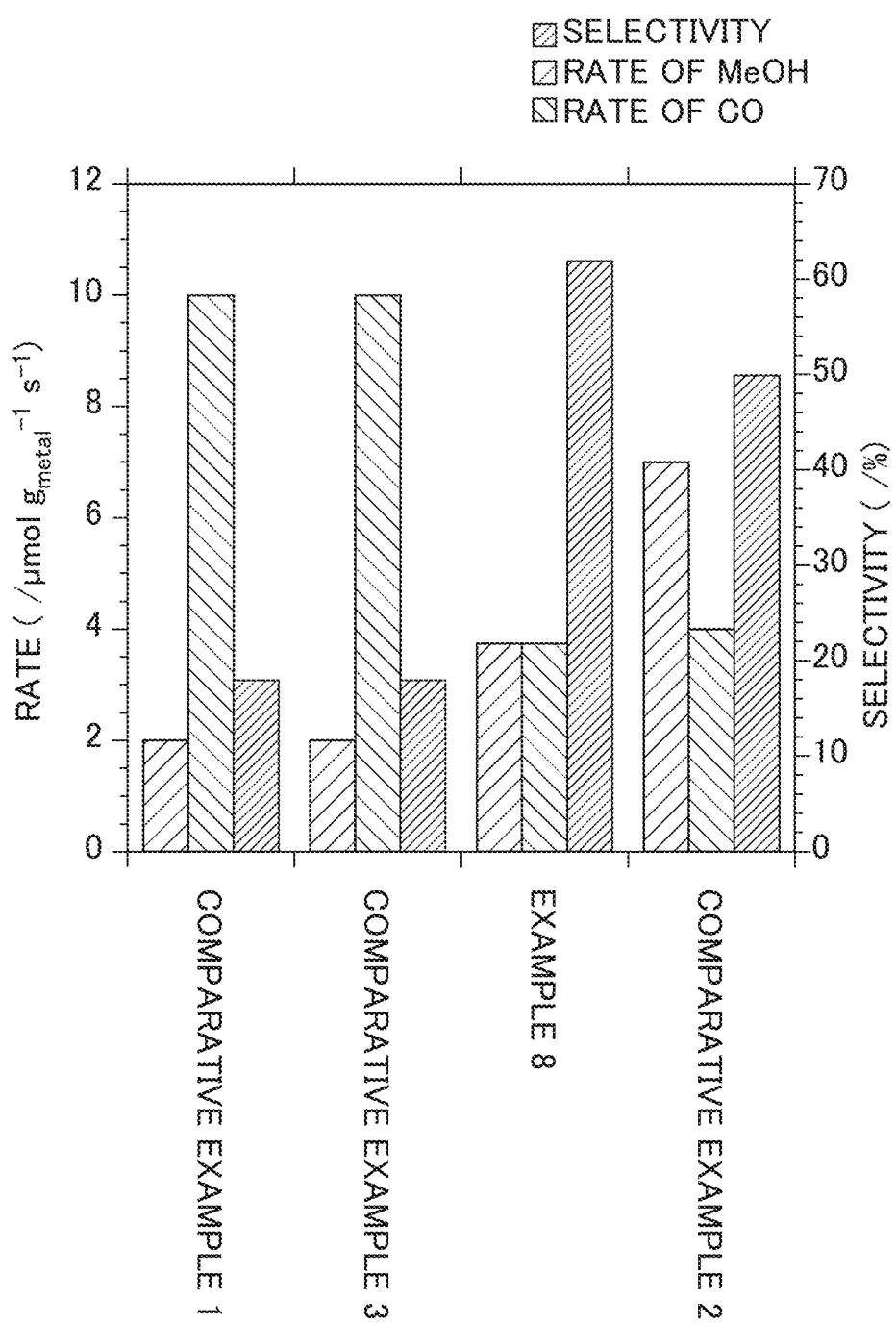
FIG. 8 is a graph showing a methanol selectivity, a methanol production rate, and a carbon monoxide production rate for the carbon dioxide reduction catalysts of Example and Comparative Examples.

FIG. 8 is a graph showing the results of carbon dioxide reduction reactions in the same manner as in FIG. 7 under a pressure condition of 5 bar and a temperature condition of 240° C. In the graph in FIG. 8, a left vertical axis and a right vertical axis represent the MeOH and CO production rates and the MeOH selectivity, respectively, as in FIG. 6.

As shown in FIGS. 7 and 8, the carbon dioxide reduction catalyst of Example exhibited a higher MeOH selectivity than those of the carbon dioxide reduction catalysts of Comparative Examples at pressure conditions of 50 bar and 5 bar.

(Comparison Test of Methanol Selectivity)

Figure 9:
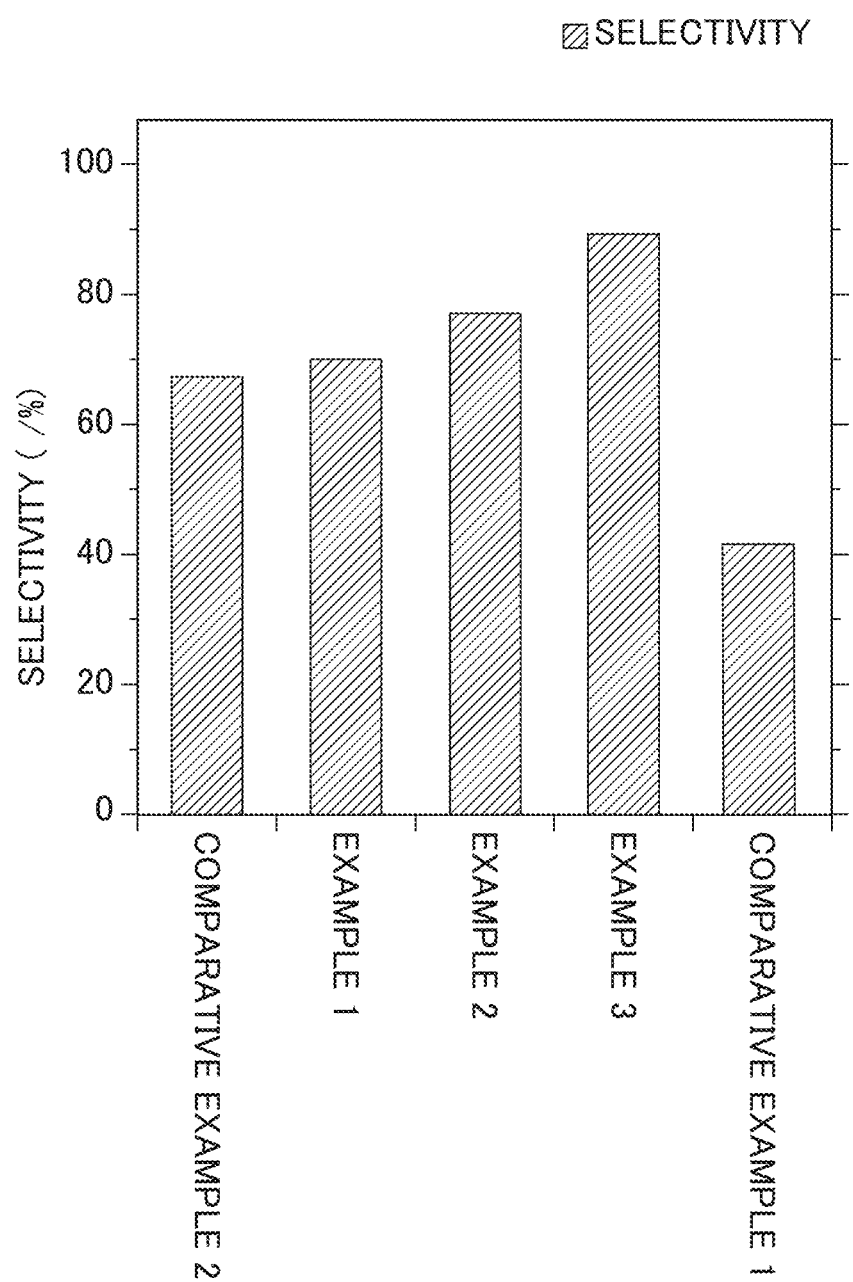
FIG. 9 is a graph showing a methanol selectivity for the carbon dioxide reduction catalysts of Examples and Comparative Examples.

FIG. 9 is a graph showing the results of carbon dioxide reduction reactions using the carbon dioxide reduction catalysts of Examples 1 to 3 and Comparative Examples 1 and 2 under a pressure condition of 40 bar and a temperature condition of 240° C. In the graph in FIG. 9, a vertical axis represents a MeOH selectivity.

As shown in FIG. 9, the carbon dioxide reduction catalysts of Examples exhibited a higher MeOH selectivity than those of the carbon dioxide reduction catalysts of Comparative Examples under a pressure condition of 40 bar and a temperature condition of 240° C. Among them, the carbon dioxide reduction catalyst of Example 3 treated at a hydrogen reduction treatment temperature of 500° C. exhibited a high MeOH selectivity of 80% or more.

(Comparison Test of Methanol Selectivity Under Condition of 240° C.)

Figure 10:
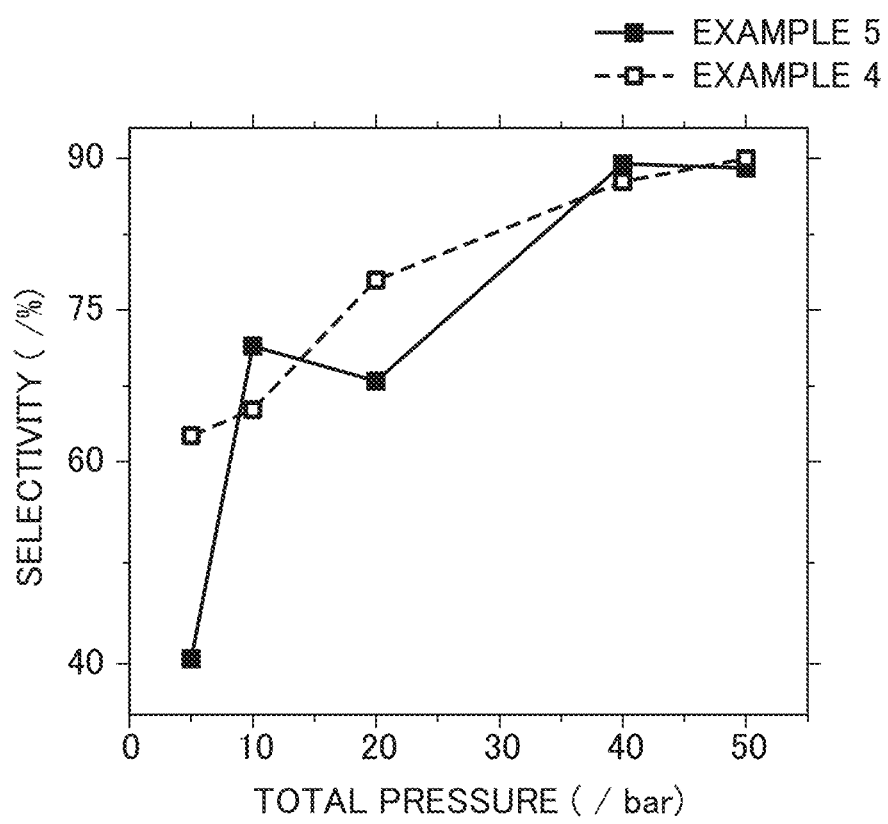
FIG. 10 is a graph showing a methanol selectivity for the carbon dioxide reduction catalysts of Examples.

FIG. 10 is a graph showing the results of carbon dioxide reduction reactions using the carbon dioxide reduction catalysts of Examples 4 and 5 under a temperature condition of 240° C. and different pressure conditions. In the graph in FIG. 10, a horizontal axis represents a pressure condition in the carbon dioxide reduction reactions (bar) and a vertical axis represents a MeOH selectivity (%). In FIG. 8, a solid line represents the result of the carbon dioxide reduction catalyst of Example 5 and a dashed line represents the result of the carbon dioxide reduction catalyst of Example 4.

As shown in FIG. 10, the carbon dioxide reduction catalysts of Examples also exhibited a high MeOH selectivity under pressure conditions of 50 bar or less. Among them, the carbon dioxide reduction catalyst of Example 5 treated at a hydrogen reduction treatment temperature of 500° C. exhibited a high MeOH selectivity even under the pressure condition of 5 bar.

[Tem-Eds Measurement]

Figure 11:
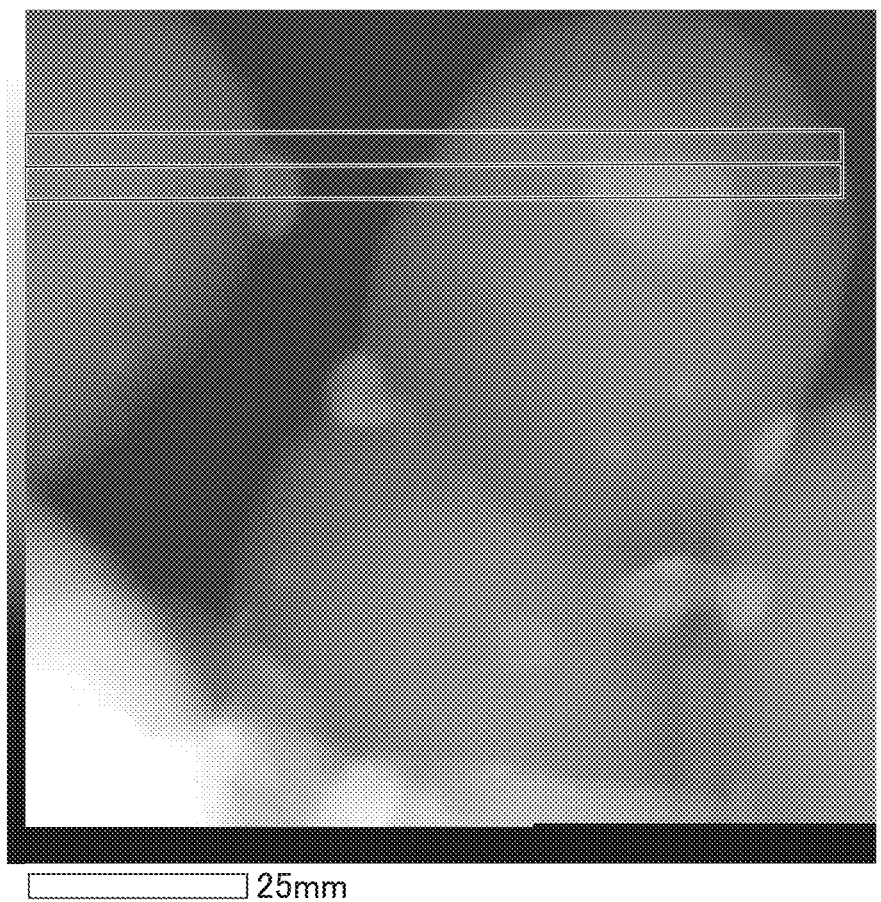
FIG. 11 is a TEM image of a carbon dioxide reduction catalyst of Example.
Figure 12:
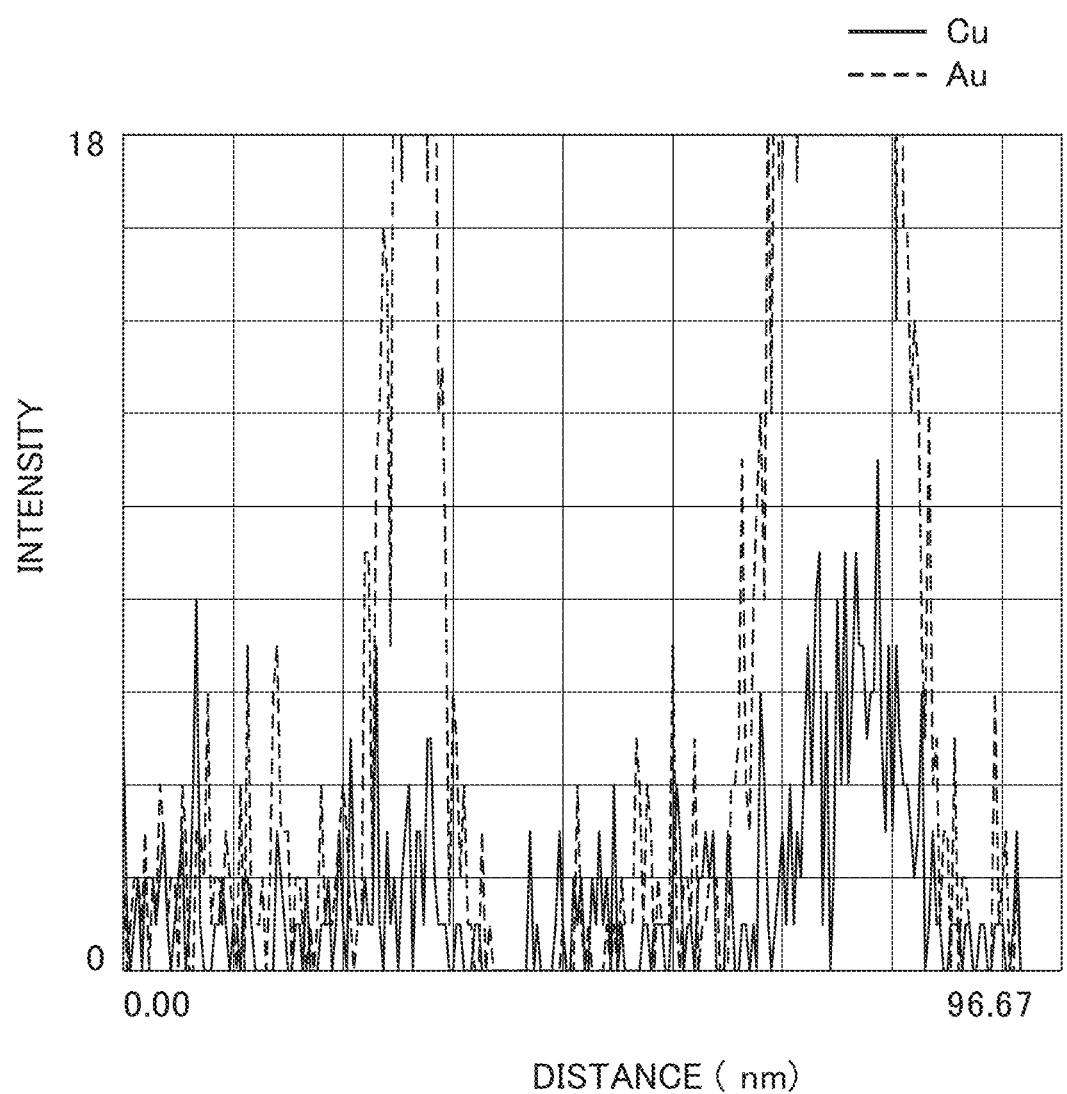
FIG. 12 is a graph showing the result of a TEM-EDS analysis of the carbon dioxide reduction catalyst of Example.

The carbon dioxide reduction catalysts were observed with transmission electron microscopy (TEM) using a transmission electron microscope. FIG. 11 is a portion of a TEM image of the carbon dioxide reduction catalyst of Example 5. FIG. 12 is a graph of peak intensities of Cu and Au (CuKa, AuKa) measured in an area enclosed by a frame border in FIG. 11 as measured by TEM-EDS measurement. In the graph in FIG. 12, a horizontal axis represents a distance (nm) and a vertical axis represents a peak intensity. In the graph in FIG. 12, a solid line represents a peak intensity of Cu and a dashed line represents a peak intensity of Au.

As shown in FIGS. 11 and 12, it is shown that gold (Au) and copper (Cu) serving as the catalyst components are supported together in the same small area of a 10 nm square or less in the carbon dioxide reduction catalyst of Example 5. Thus, the gold (Au) and the copper (Cu) are expected to form an alloy.

[Xrd Measurement]

Figure 13:
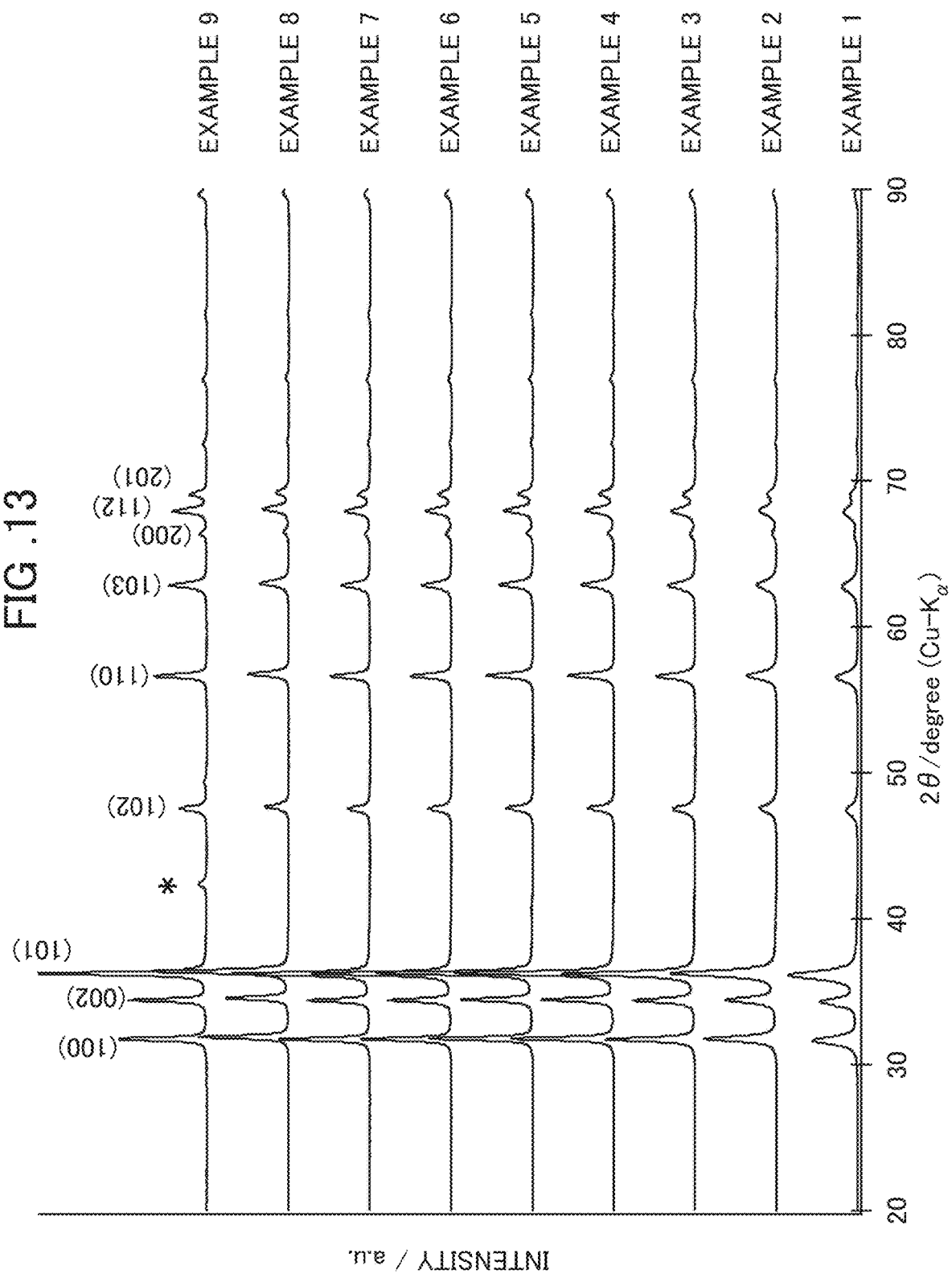
FIG. 13 is a graph showing the results of an XRD analysis of the carbon dioxide reduction catalysts of Examples.

FIG. 13 is a chart showing the results of a crystal structure analysis with X-ray diffraction (XRD) of the carbon dioxide reduction catalysts of Examples 1 to 9. An X-ray diffractometer (MiniFlex, manufactured by Rigaku Corporation) was used for measurement. As shown in FIG. 13, neither a peak derived from elemental Au(38.3°) nor a peak derived from elemental Cu(43.3°) was observed in the carbon dioxide reduction catalysts of Examples 1 to 9. Therefore, the Au and the Cu are expected to be in a highly dispersed state in the carbon dioxide reduction catalyst of Examples 1 to 9. Note that, the "highly dispersed state", as used herein, means that the Au and the Cu are present as tiny crystalline particles of several nanometers or less or amorphous.

[Mossbauer Spectroscopy]

Figure 14:
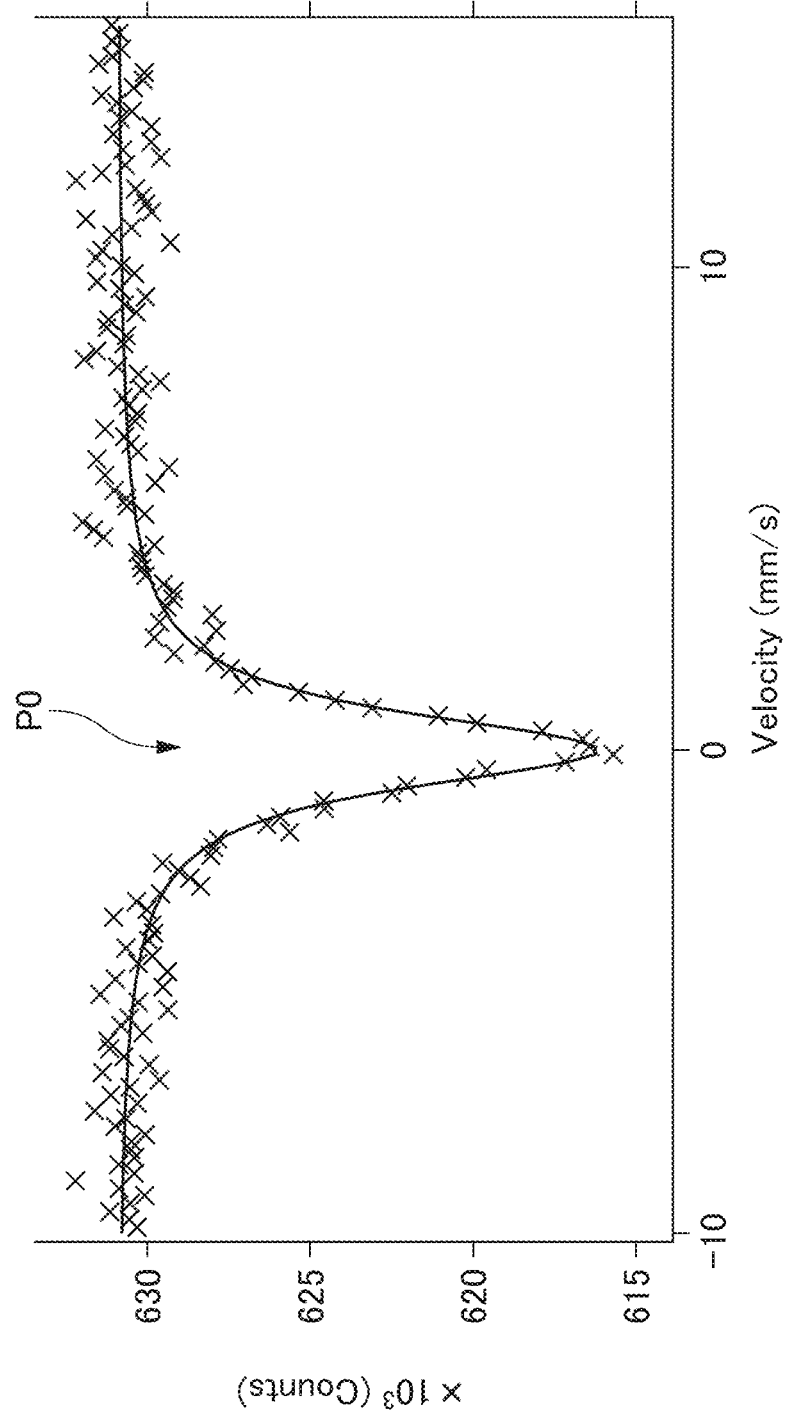
FIG. 14 is a chart showing the result of a Mossbauer analysis of Comparative Example.
Figure 15:
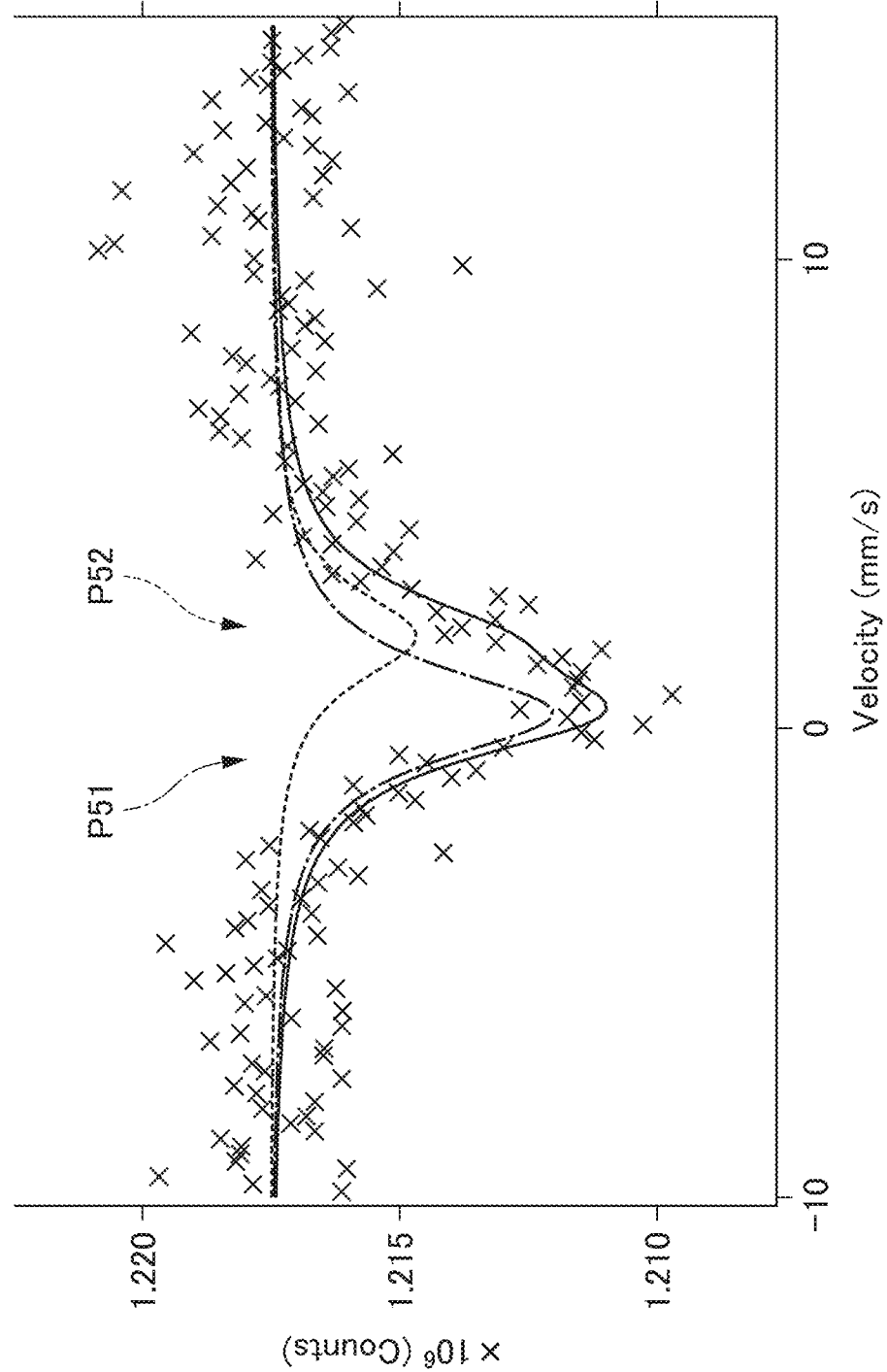
FIG. 15 is a chart showing the result of a Mossbauer analysis of Example.
Figure 16:
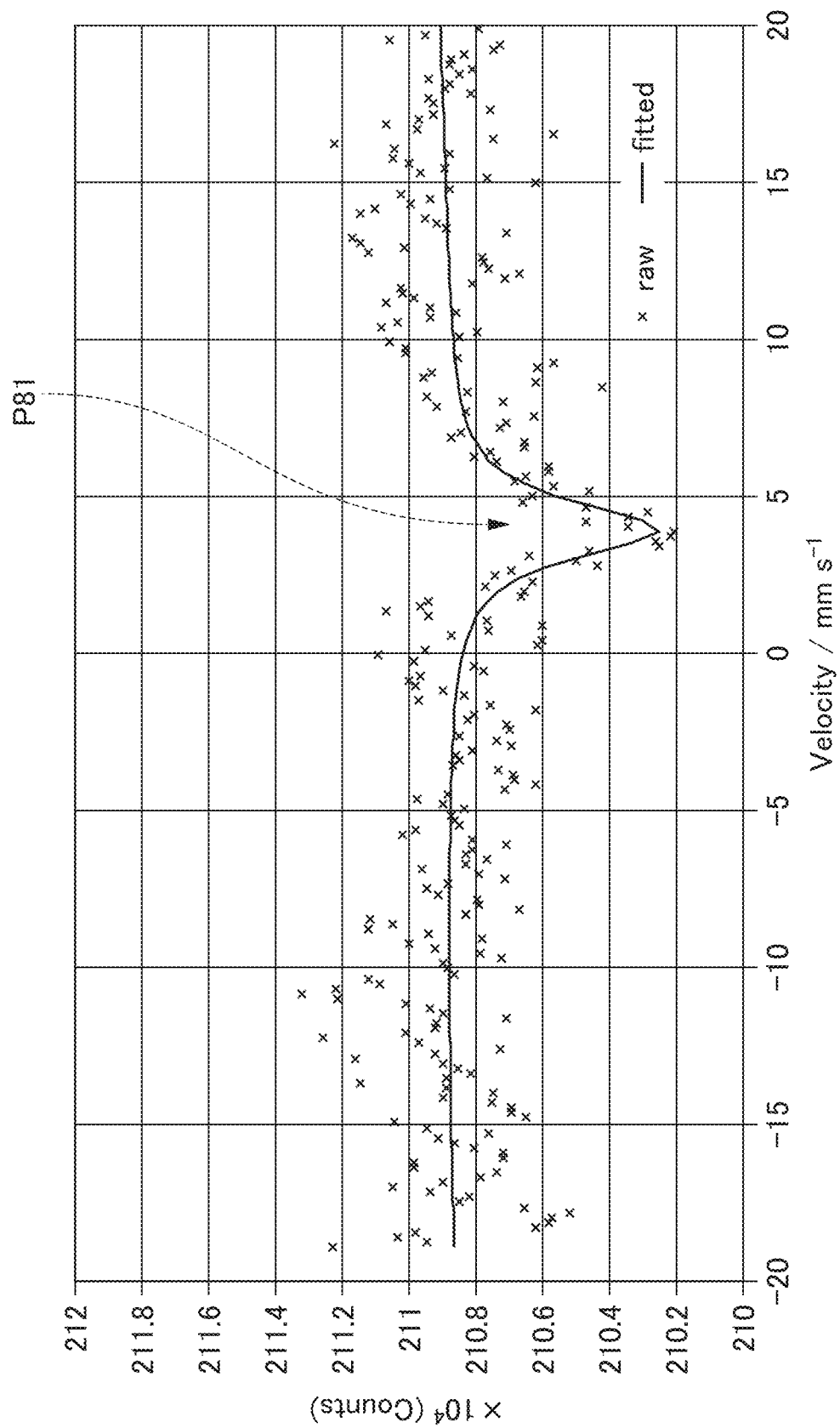
FIG. 16 is a chart showing the result of a Mossbauer analysis of Example.
Figure 17:
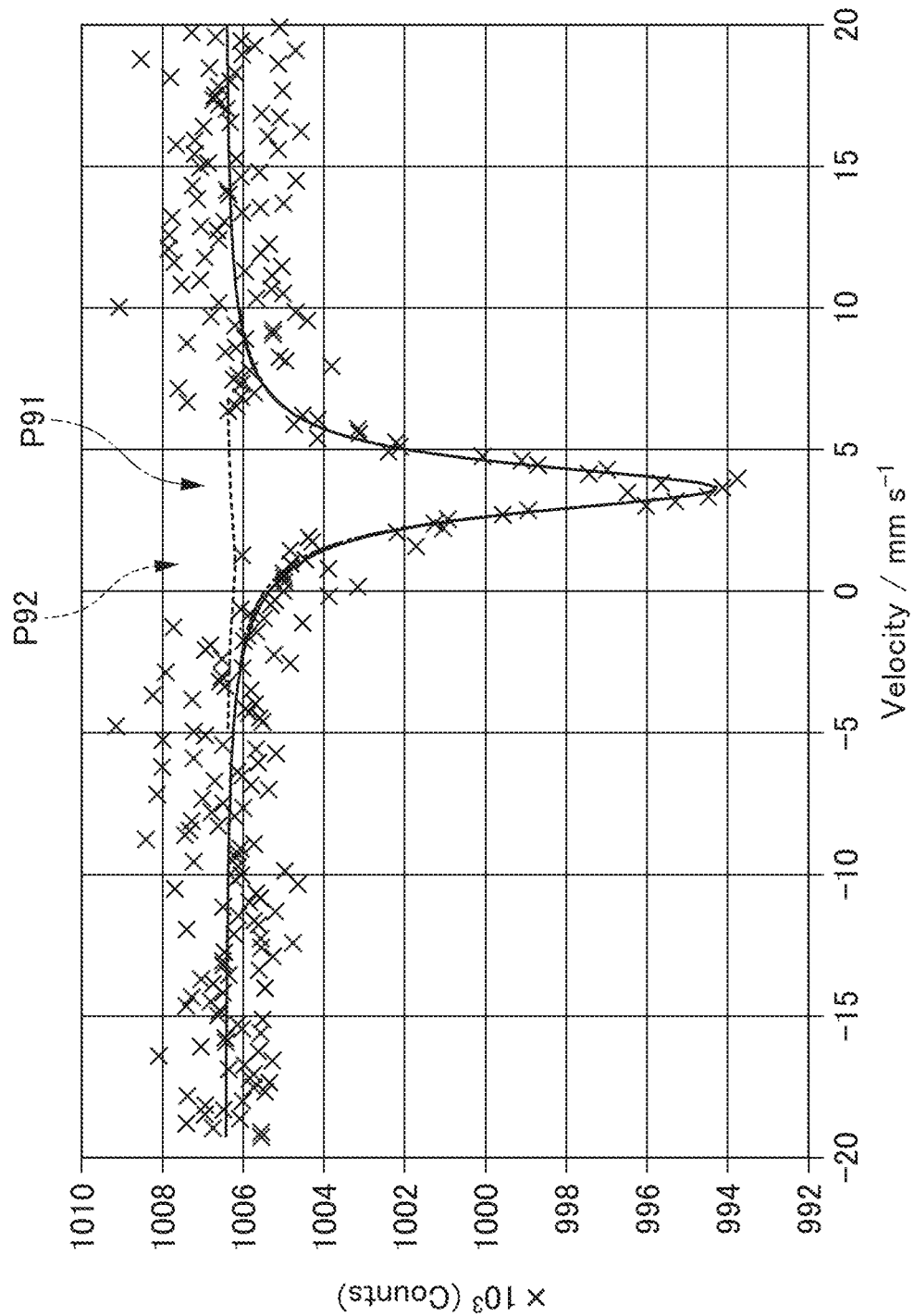
FIG. 17 is a chart showing the result of a Mossbauer analysis of Example.

FIGS. 14 to 17 are charts of the results of $^{197}$Au Mossbauer spectroscopy in the carbon dioxide reduction catalysts of Examples and Comparative Example. The Mossbauer spectrometry was performed as follows. A powdered sample was placed into a sample cell and $^{197}$Pt (half-life: 18.6 hours, gamma-ray energy: 77.4 keV) produced by irradiation with neutrons in a nuclear reactor was used as a gamma-ray source. A temperature at which the Mossbauer spectrometry was performed ranged from −261 to −264° C. The spectrometry was performed at Institute for Integrated Radiation and Nuclear Science, Kyoto University. FIG. 14 shows a $^{197}$Au Mossbauer spectrum of gold foil serving as a standard material (corresponding to Comparative Example 2) and a peak position P0 is set as a position at which velocity (mm/s) is 0 in FIGS. 15, 16, and 17. FIG. 15 shows a $^{197}$Au Mossbauer spectrum of the carbon dioxide reduction catalyst of Example 5, FIG. 16 shows a $^{197}$Au Mossbauer spectrum of the carbon dioxide reduction catalyst of Example 8, and FIG. 17 shows a $^{197}$Au Mossbauer spectrum of the carbon dioxide reduction catalyst of Example 9. An isomer shift from the $^{197}$Au Mossbauer spectrum of the standard material shown in FIG. 14 was determined and peak splitting was performed for FIGS. 15, 16, and 17 to thereby evaluate components of the alloy.

For the carbon dioxide reduction catalyst of Example 5 shown in FIG. 15, isomer shifts to P51 (0.33 mm/s, component area rate: 66.0%, Cu concentration: 8%) and P52

(1.97 mm/s, component area rate: 34.0%, Cu concentration: 49%) were observed. The above-mentioned Cu concentrations were converted from the isomer shifts. This can be interpreted that there are 66% Au atoms with 8% of atoms surrounding a single Au atom being Cu atoms, and 34% Au atoms with 49% of atoms surrounding a single Au atom being Cu atoms. Therefore, this shows that Au is alloyed.

For the carbon dioxide reduction catalyst of Example 8 shown in FIG. 16, an isomer shift to P81 (3.94 mm/s, component area rate: 100%, Cu concentration: 98.6%) was observed. The above-mentioned Cu concentration was converted from the isomer shift. This can be interpreted that there are 100% Au atoms with 98.6% of atoms surrounding a single Au atom being Cu atoms. Therefore, this shows that Au is alloyed.

For the carbon dioxide reduction catalyst of Example 9 shown in FIG. 17, isomer shifts to P91 (3.63 mm/s, component area rate: 96.4%, Cu concentration: 91%) and P92 (0.99 mm/s, component area rate: 3.6%, Cu concentration: 25%) were observed. The above-mentioned Cu concentrations were converted from the isomer shifts. This can be interpreted that there are 96.4% Au atoms with 91% of atoms surrounding a single Au atom being Cu atoms, and 3.6% Au atoms with 25% of atoms surrounding a single Au atom being Cu atoms. Therefore, this shows that Au is alloyed.

[Xafs Measurement]

Figure 18:
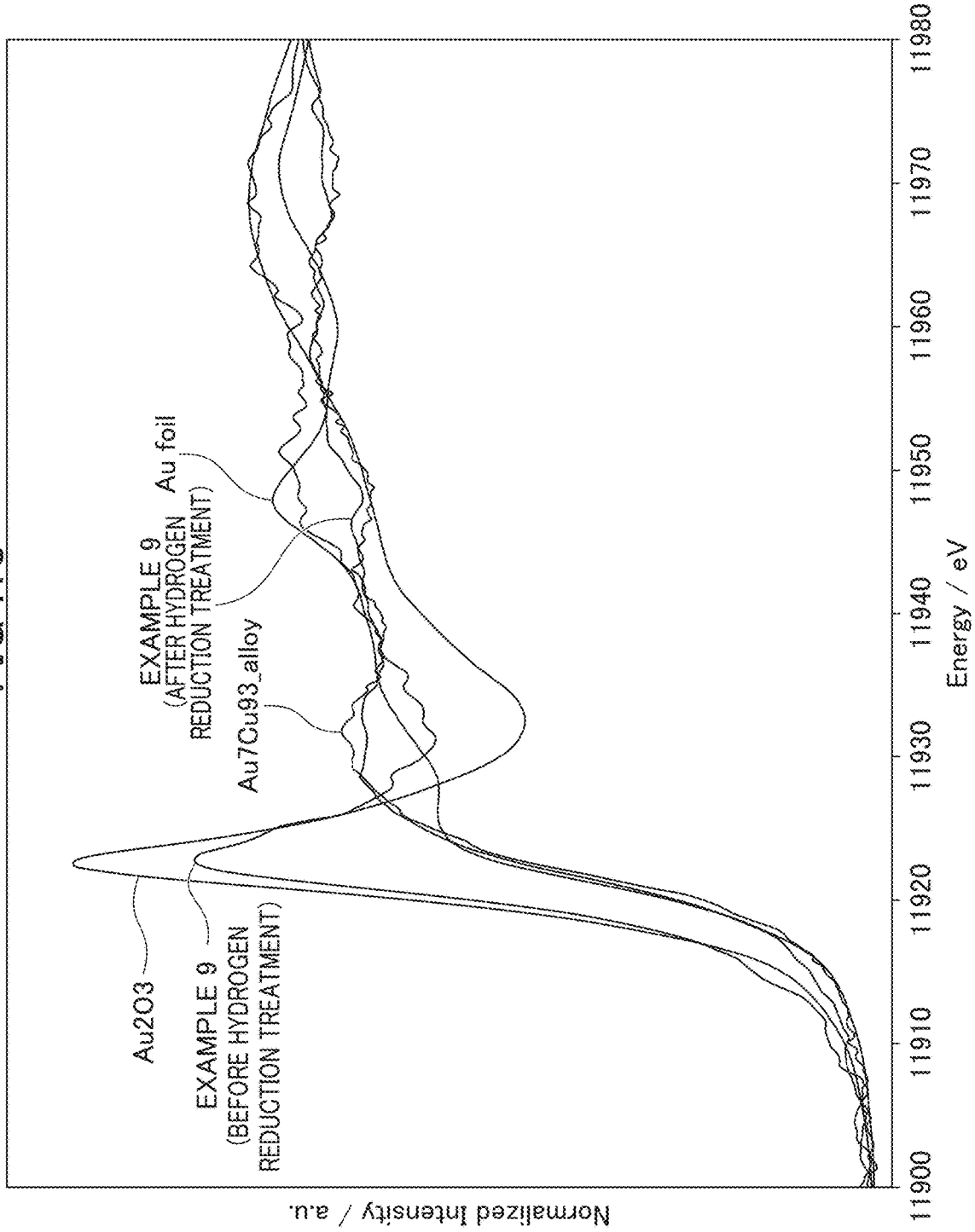
Figure 19:
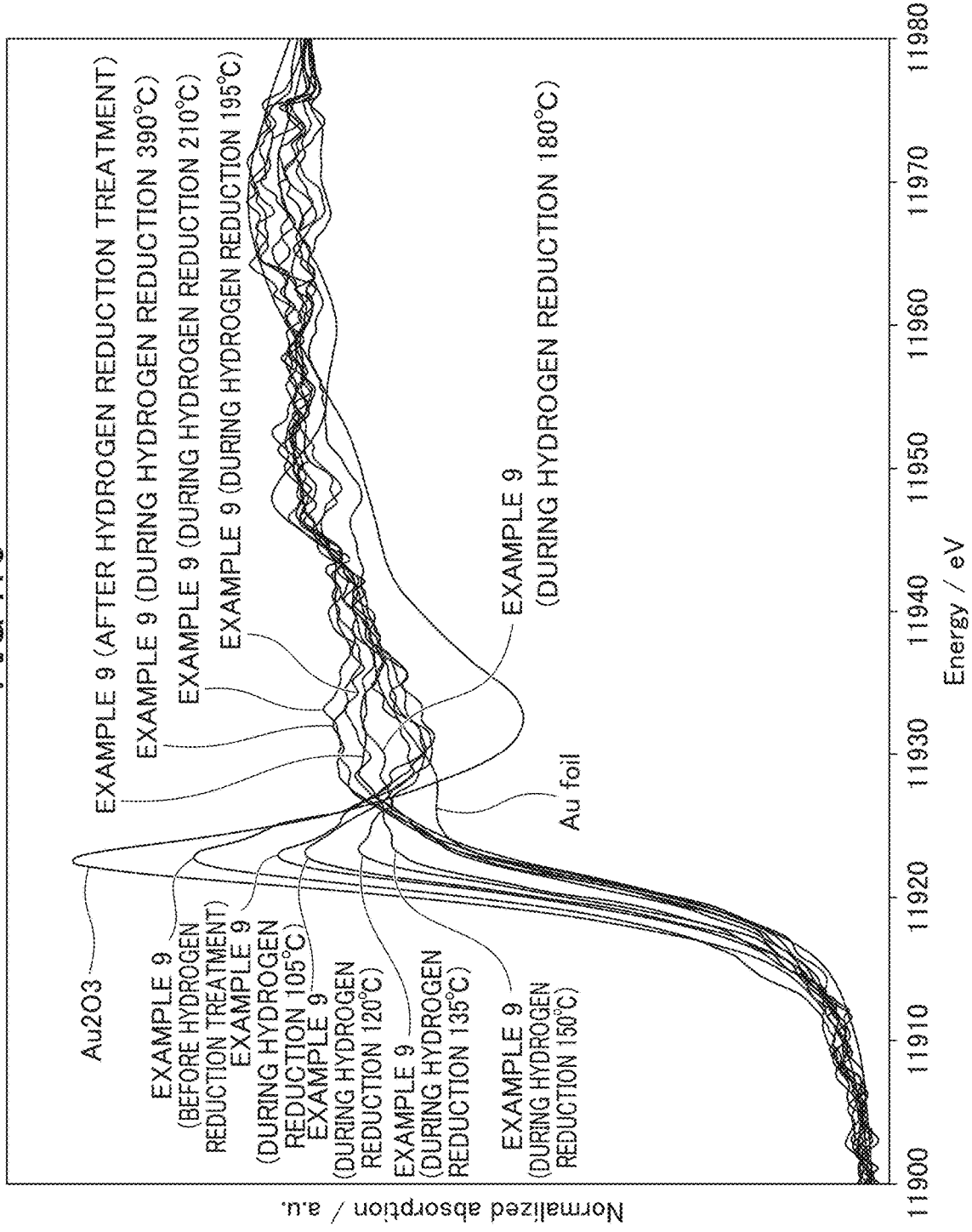
Figure 20:
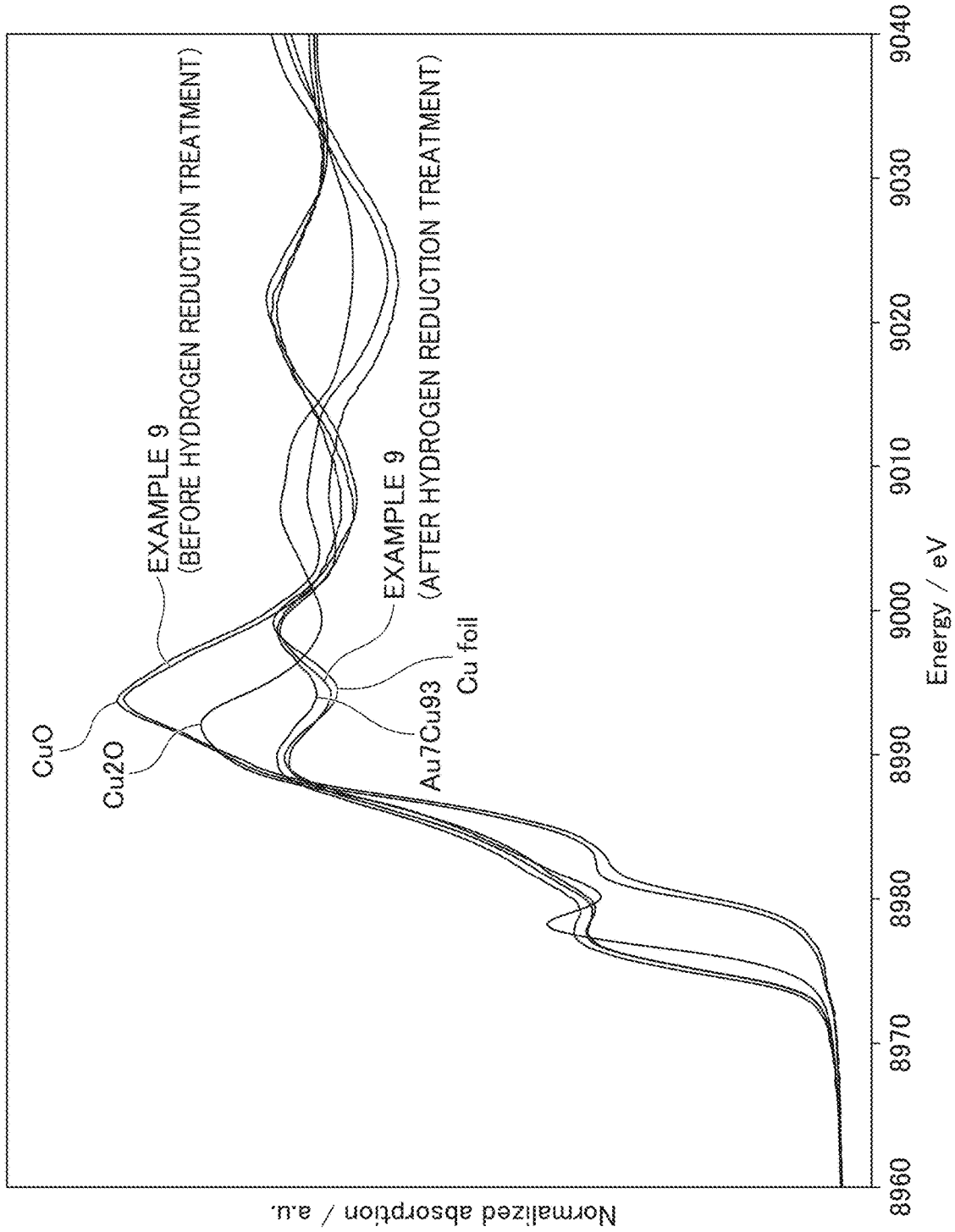
Figure 21:
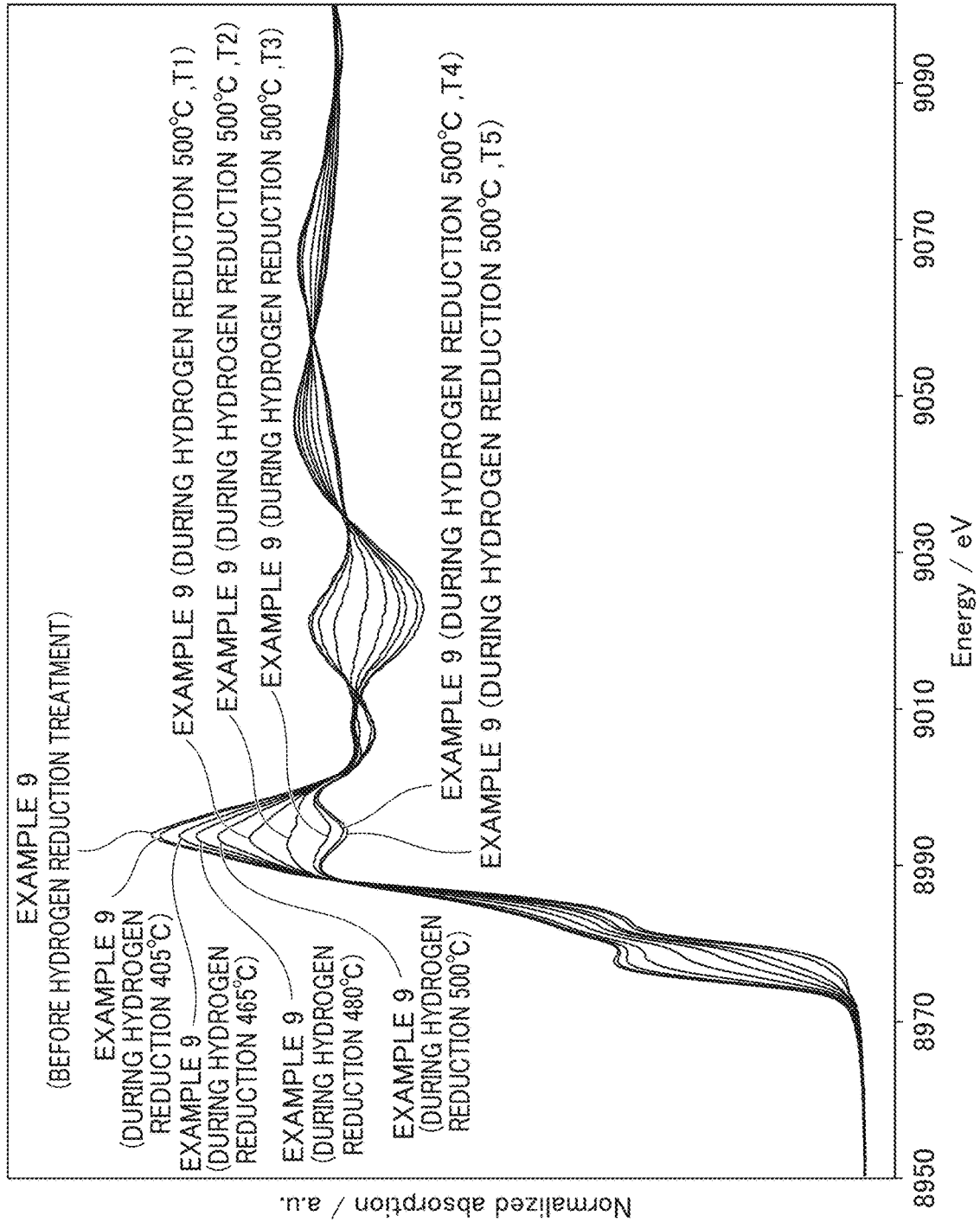

FIGS. 18 to 21 are charts showing the results of X-ray absorption fine structure (XASF) analysis when the carbon dioxide reduction catalyst of Example 9 was subjected to the hydrogen reduction treatment. FIGS. 18 and 19 show the analysis results at an $AuL_3$-edge and FIGS. 20 and 21 show the analysis results at an CuK-edge. The XAFS analysis was performed as follows. The analysis was performed at the large synchrotron radiation facility SPring-8, Beamline II for industrial applications (BL14B2) (Hyogo Prefecture, Japan). A Si (311) surface for the $AuL_3$-edge and a Si (111) surface for the CuK-edge were used as analyzing crystals. The $AuL_3$-edge and the CuK-edge were measured by a transmission method. A cell having a diameter of about 10 mm was packed with a sample sandwiched between filter papers and set in a quartz cell for in-situ measurement. After measurement at room temperature, the measurement was performed while 10% by volume $H_2$/He (20 mL/min) was circulated and a temperature was raised from room temperature to 500° C. at 5° C./min. After a certain period of time had elapsed since the temperature reached 500° C., the cell was cooled to room temperature and measured again. An analysis software Athena in Ifeffit was used for spectral analysis.

FIG. 18 shows XASF spectra at the $AuL_3$-edge of the carbon dioxide reduction catalyst of Example 9 before and after the hydrogen reduction treatment, and gold foil (Au), gold oxide ($Au_2O_3$), and an AuCu alloy (Au7Cu93) for comparison. In FIG. 18, a horizontal axis represents energy (eV) and a vertical axis represents normalized absorption (a.u.) (common in FIGS. 19 to 21). As shown in FIG. 18, it was observed that the carbon dioxide reduction catalyst of Example 9 showed a peak in the proximity of the gold oxide ($Au_2O_3$) before the hydrogen reduction treatment, but showed a peak in the proximity of the AuCu alloy (Au7Cu93) after the hydrogen reduction treatment (500° C.). This suggests that Au and Cu form an alloy by the hydrogen reduction treatment in the carbon dioxide reduction catalyst of Example 9.

FIG. 19 shows XASF spectra at the $AuL_3$-edge of the carbon dioxide reduction catalyst of Example 9 at the predetermined temperature before, during, and after the hydrogen reduction treatment, and gold foil (Au) and gold oxide ($Au_2O_3$) for comparison. As shown in FIG. 19, for the carbon dioxide reduction catalyst of Example 9, it was observed that a peak at a position corresponding to the gold oxide ($Au_2O_3$) began to decrease at a temperature condition of 105° C. or less, and most of the peak at the position corresponding to gold oxide ($Au_2O_3$) disappeared and was shifted to a position in the proximity to the gold foil (Au) at a temperature condition 150° C. or more. This confirmed that Au was reduced by the hydrogen reduction treatment at a temperature condition of 400° C. or less in the carbon dioxide reduction catalyst of Example 9.

FIG. 20 shows XASF spectra at a CuK-edge of the carbon dioxide reduction catalyst of Example 9 before and after the hydrogen reduction treatment, and an AuCu alloy (Au7Cu93), copper foil (Cu), and copper oxide ((II:CuO and I:$Cu_2O$) for comparison. As shown in FIG. 20, it was observed that the carbon dioxide reduction catalyst of Example 9 showed a peak in the proximity of the copper oxide (II:CuO) before the hydrogen reduction treatment, that is, Cu was present as divalent copper. On the other hand, it was observed that the carbon dioxide reduction catalyst of Example 9 showed a peak in the proximity of the AuCu alloy (Au7Cu93) after the hydrogen reduction treatment (500° C.). This suggests that Au and Cu form an alloy by the hydrogen reduction treatment in the hydrogen reduction catalyst of Example 9.

FIG. 21 shows XASF spectra at a CuK-edge of the carbon dioxide reduction catalyst of Example 9 at the predetermined temperature before, during, and after the hydrogen reduction treatment. In FIGS. 21, T1 to T5 represent predetermined retention times after reaching 500° C., T1 represents 5 min, T2 represents 10 min, T3 represents 15 min, T4 represents 20 min, and T5 represents 25 min. As shown in FIG. 21, it was observed that the carbon dioxide reduction catalyst of Example 9 showed a change in that a peak in the proximity of an absorption edge decreased from the spectrum similar to that of copper oxide (II:CuO) in FIG. 20 at a temperature condition 405° C. or less. Furthermore, it was observed that most of a peak at a position corresponding to Cu(II) disappeared and shifted to a position in the proximity of that of copper foil (Cu) about 10 minutes after reaching 500° C. This confirmed that Cu was reduced by the hydrogen reduction treatment at a temperature condition of 400° C. or less in the carbon dioxide reduction catalyst of Example 9.

[HAADF-STEM Measurement]

The carbon dioxide reduction catalysts of Examples 5, 8, and 9 were measured with high-angle annular dark field scanning transmission electron microscopy (HAADF-STEM). Each of the catalysts of Examples 5, 8, and 9 was dispersed in ethanol, added to a Ni grid for TEM measurement dropwise, and dried to prepare a sample for measurement. Titan G2 60-300 (manufactured by FEI company) was used for the measurement.

Figure 22:
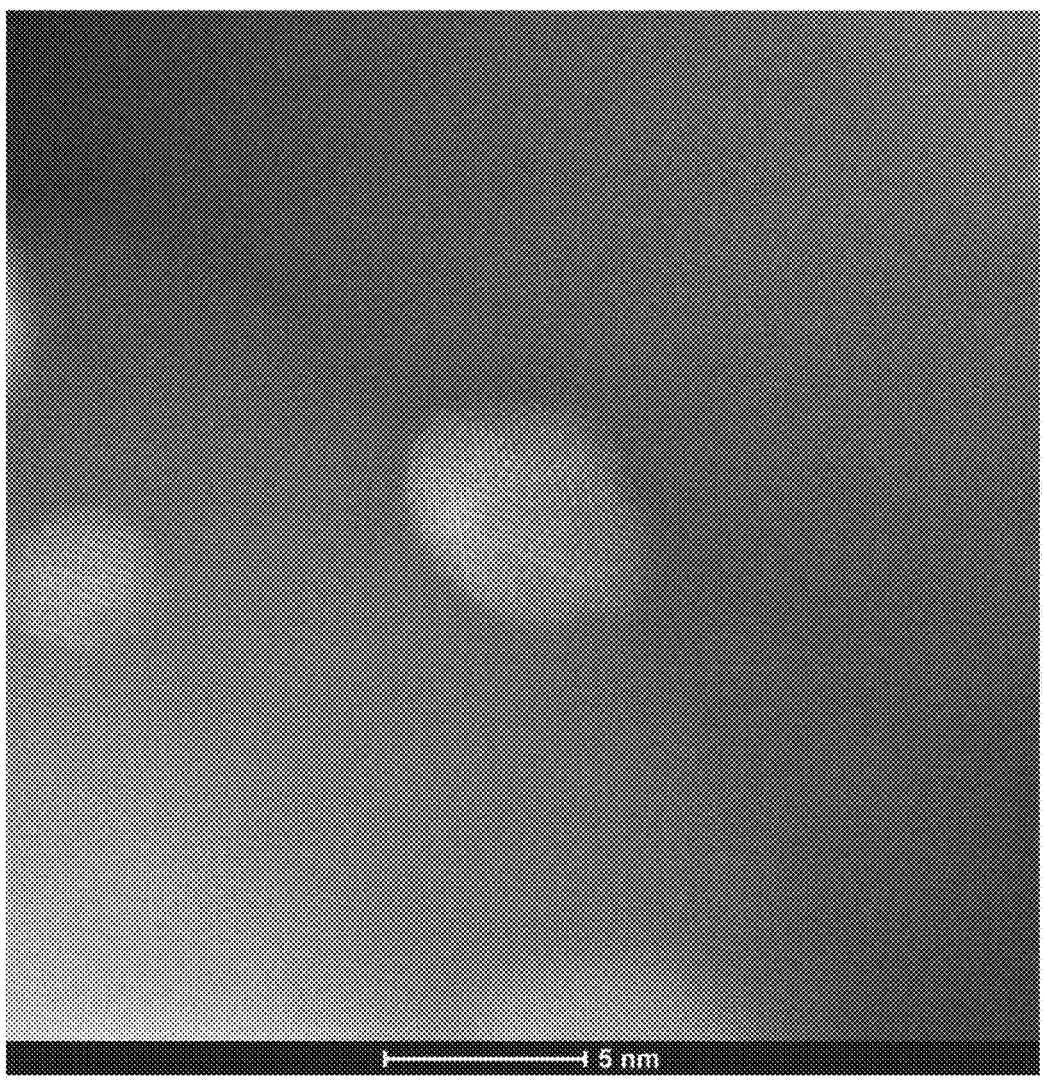
FIG. 22 is a HAADF-STEM image of the carbon dioxide reduction catalysts of Example 5.
Figure 23:
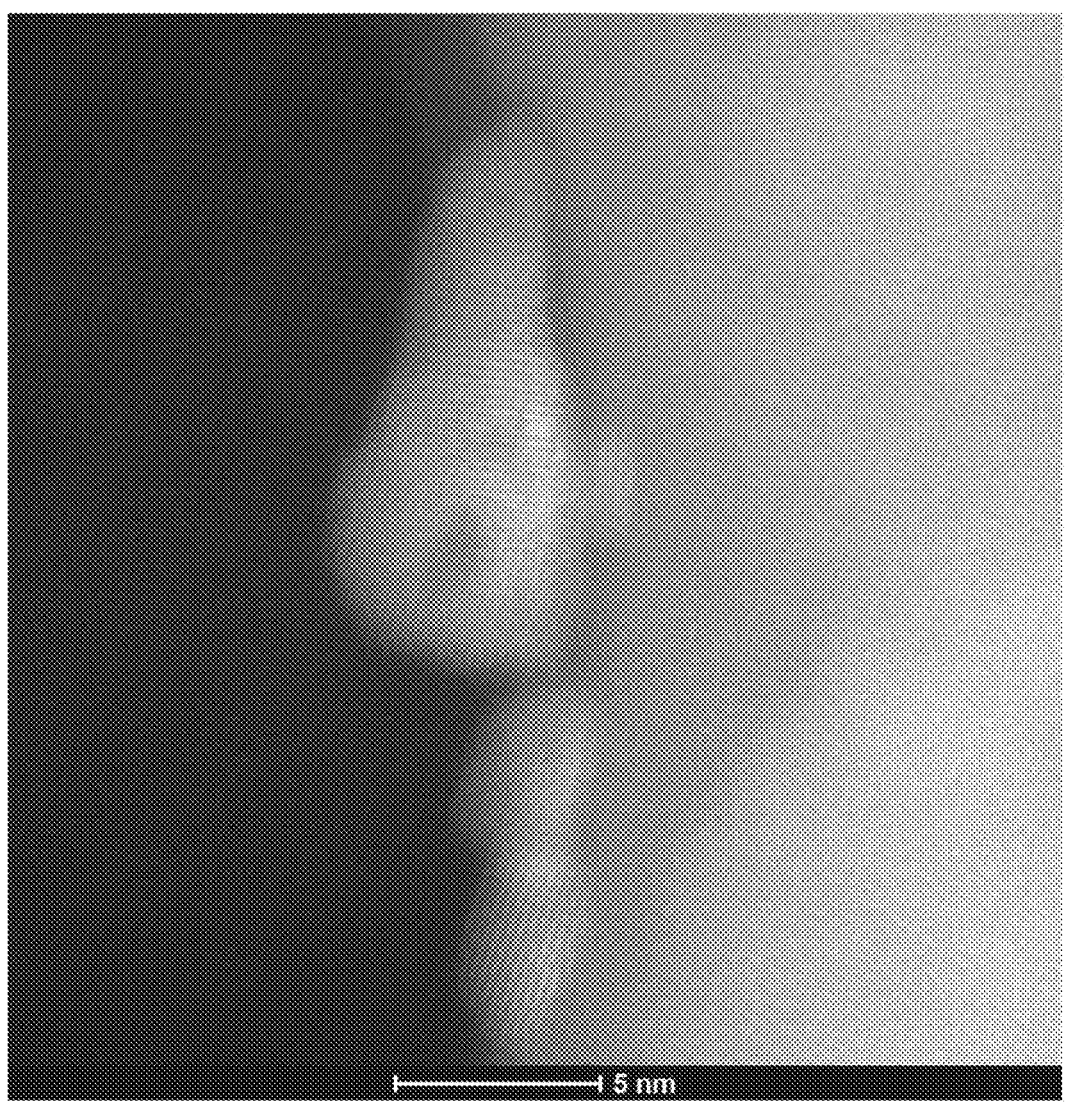
FIG. 23 is a HAADF-STEM image of the carbon dioxide reduction catalysts of Example 8.
Figure 24:
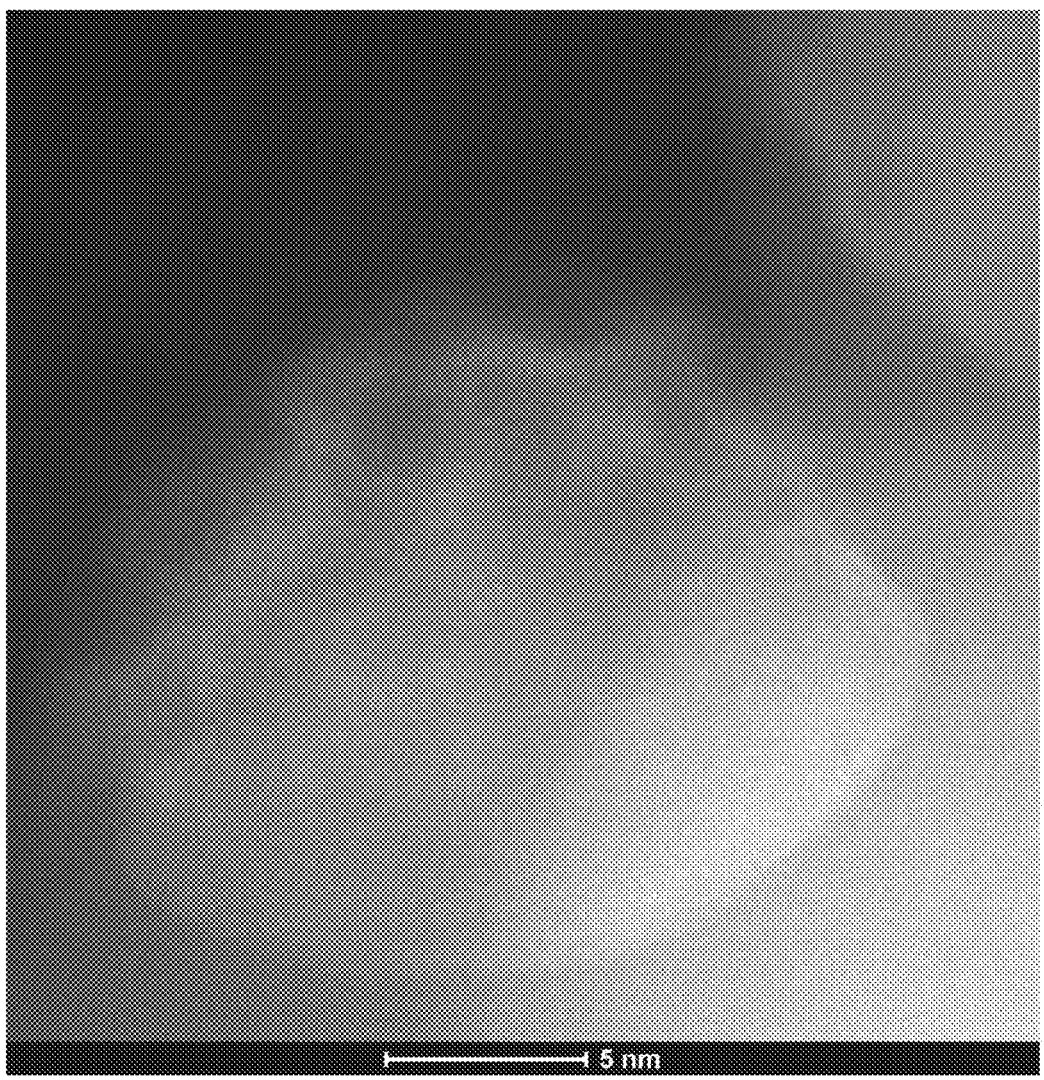
FIG. 24 is a HAADF-STEM image of the carbon dioxide reduction catalysts of Example 9.

FIGS. 22, 23, and 24 show the HAADF-STEM results of the carbon dioxide reduction catalysts of Examples 5, 8, and 9, respectively. In the carbon dioxide reduction catalysts of the above-mentioned Examples, a nanoparticle supported on a ZnO support shown in FIGS. 22 to 24 were observed to be composed of high-brightness atoms and low-brightness atoms. In the HAADF-STEM measurement, an atom with a higher atomic number has a higher brightness. Therefore, the high-brightness atoms in FIGS. 22 to 24 represent Au atoms, and the low-brightness atoms represent Cu atoms. The above results show that Au and Cu form a single nanoparticle on the ZnO support. This suggests that the gold (Au) and the copper (Cu) form an alloy.

[Durability Test]

Figure 25:
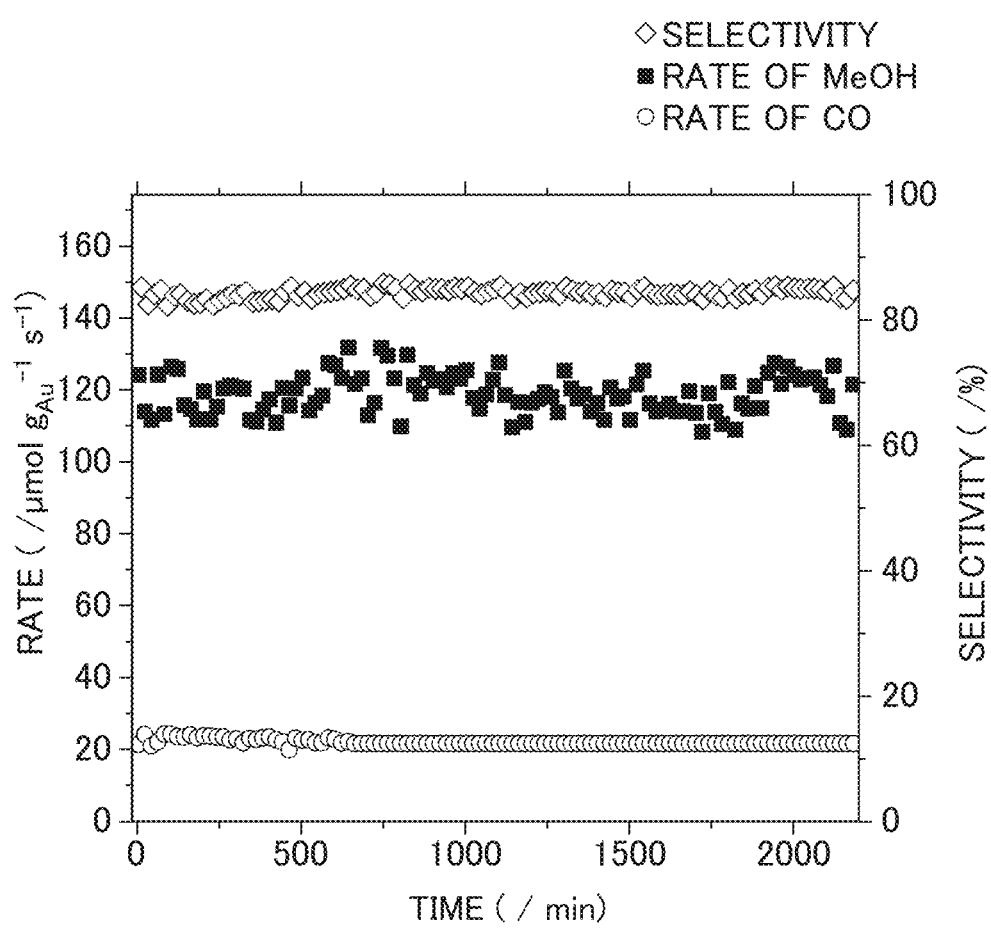
FIG. 25 is a graph showing a methanol selectivity, a methanol production rate, and a carbon monoxide production rate for the carbon dioxide reduction catalysts of Example.
Figure 26:
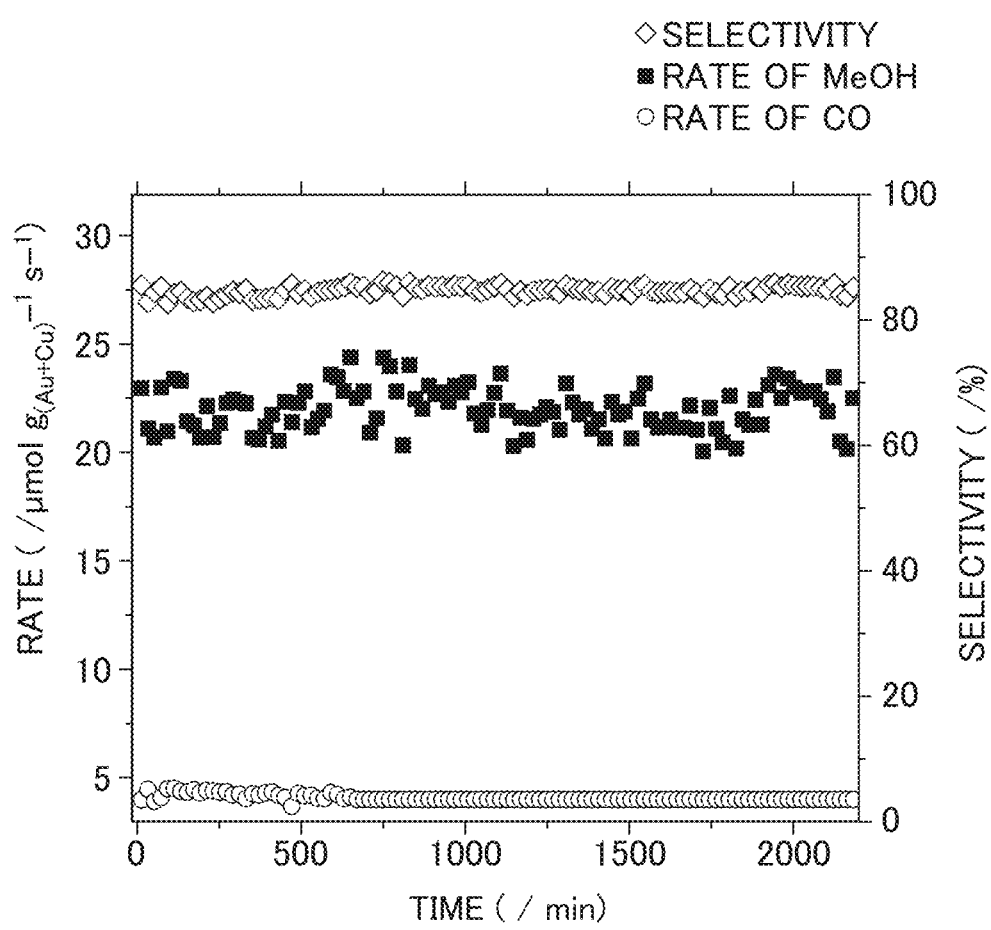
FIG. 26 is a graph showing a methanol selectivity, a methanol production rate, and a carbon monoxide production rate for the carbon dioxide reduction catalysts of Example.

FIGS. 25 and 26 are graphs showing the results of continuous carbon dioxide reduction reactions using the carbon dioxide reduction catalyst of Example 8 under a pressure condition of 50 bar and a temperature condition of 240° C. Changes in MeOH and CO production rates and a MeOH selectivity over time were measured and the results are shown in the graphs in FIGS. 25 and 26. In the graphs in FIGS. 25 and 26, a horizontal axis represents time (min) and a right vertical axis represents a MeOH selectivity. A left vertical axis in FIG. 25 represents MeOH and CO production rates (/µmol gAu$^{-1}$ s$^{-1}$) relative to an amount of Au contained in catalyst components (g). A left vertical axis in FIG. 26 represents MeOH and CO production rates (/µmol gAu$^{-1}$ s$^{-1}$) relative to a total amount of Au and Cu contained in catalyst components (g).

As shown in FIGS. 25 and 26, the carbon dioxide reduction catalyst according to Example exhibited high stability, and no deterioration in activity or methanol selectivity was observed even when it continuously underwent the carbon dioxide reduction reaction for 2000 min or more.

The invention claimed is:

1. A carbon dioxide reduction catalyst for use in production of methanol by a reduction reaction of carbon dioxide, the catalyst comprising:
   Au and Cu serving as catalyst components, and
   ZnO serving as a support,
   wherein the catalyst components comprise 7 to 25% by mole of the Au.

2. The carbon dioxide reduction catalyst according to claim 1, having a methanol selectivity in reduction of carbon dioxide of 80% or more.

3. A method for reducing carbon dioxide, comprising:
   reducing carbon dioxide using the carbon dioxide reduction catalyst according to claim 1 under a condition of 50 bar or less to thereby produce methanol.

4. A method for reducing carbon dioxide, comprising:
   reducing carbon dioxide using the carbon dioxide reduction catalyst according to claim 1 under a condition of 240° C. or less to thereby produce methanol.

5. A method for reducing carbon dioxide, comprising:
   reducing carbon dioxide using the carbon dioxide reduction catalyst according to claim 2 under a condition of 50 bar or less to thereby produce methanol.

6. A method for reducing carbon dioxide, comprising:
   reducing carbon dioxide using the carbon dioxide reduction catalyst according to claim 2 under a condition of 240° C. or less to thereby produce methanol.

7. The carbon dioxide reduction catalyst according to claim 1,
   wherein the Au and Cu serving as the catalyst components form an alloy, and
   an amount of the catalyst components supported on the support is 0.1 to 10% by weight.

8. The carbon dioxide reduction catalyst according to claim 1, consisting of the Au and Cu serving as the catalyst components,
   wherein an amount of the catalyst components supported on the support is 0.1 to 10% by weight.

* * * * *